United States Patent
Sarkar et al.

(10) Patent No.: US 8,352,914 B2
(45) Date of Patent: Jan. 8, 2013

(54) IMPACT ANALYSIS OF SOFTWARE CHANGE REQUESTS

(75) Inventors: Santonu Sarkar, Bangalore (IN); Arun Panayappan, Bangalore (IN); Kimberly Sparkes Ostman, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 996 days.

(21) Appl. No.: 12/388,237

(22) Filed: Feb. 18, 2009

(65) Prior Publication Data

US 2010/0153908 A1 Jun. 17, 2010

(30) Foreign Application Priority Data

Dec. 15, 2008 (IN) .......................... 2621/MUM/2008

(51) Int. Cl.
*G06F 9/44* (2006.01)
(52) U.S. Cl. ......... 717/121; 717/102; 717/103; 717/104
(58) Field of Classification Search .......................... None
See application file for complete search history.

(56) References Cited

U.S. PATENT DOCUMENTS

| | | | | |
|---|---|---|---|---|
| 5,860,007 A * | 1/1999 | Soni et al. | ...................... | 717/121 |
| 5,933,646 A * | 8/1999 | Hendrickson et al. | ........ | 717/169 |
| 6,256,773 B1 * | 7/2001 | Bowman-Amuah | .......... | 717/121 |
| 6,966,058 B2 * | 11/2005 | Earl et al. | ........................ | 717/171 |
| 7,103,871 B1 * | 9/2006 | Kirkpatrick et al. | .......... | 717/102 |
| 7,191,435 B2 * | 3/2007 | Lau et al. | ...................... | 717/168 |
| 7,194,475 B2 * | 3/2007 | DelMonaco et al. | ................. | 1/1 |
| 2003/0084425 A1 | 5/2003 | Glaser | | |
| 2003/0204836 A1 * | 10/2003 | Srivastava et al. | ............ | 717/124 |
| 2005/0210442 A1 * | 9/2005 | Seetharaman et al. | ........ | 717/101 |
| 2006/0080656 A1 * | 4/2006 | Cain et al. | ..................... | 717/174 |
| 2007/0143735 A1 * | 6/2007 | Clemm et al. | ................ | 717/100 |
| 2007/0143744 A1 | 6/2007 | Clemm et al. | ................ | 717/128 |
| 2007/0168957 A1 * | 7/2007 | Li et al. | ......................... | 717/120 |
| 2007/0192170 A1 * | 8/2007 | Cristol | ............................ | 705/10 |
| 2008/0059942 A1 * | 3/2008 | Brown et al. | ................. | 717/101 |

(Continued)

FOREIGN PATENT DOCUMENTS

DE 102007026226 A1 11/2008

OTHER PUBLICATIONS

Loyall, J. P. et al. "Impact Analysis and Change Management for Avionics Software," Aerospace and Electronics Conference 1997, Jul. 14017, 1997, Dayton OH, 8 pages.

(Continued)

*Primary Examiner* — Isaac Tecklu
(74) *Attorney, Agent, or Firm* — Fish & Richardson P.C.

(57) ABSTRACT

In one example, a system is provided to determine the impact of implementing a change request on a software program. The system may include an architecture model of the software program that includes components. Each of the components may have attributes that may be used by the system to determine a degree of effort to modify each respective one of the components. Components may be associated with keywords. The system may search the change request for the keywords to identify components that may be impacted by the change request. The system may determine the degree of effort to modify any impacted component based on the architecture model. The system may determine the overall impact on the software program based on the degree of effort determined for the impacted components.

19 Claims, 24 Drawing Sheets

U.S. PATENT DOCUMENTS

| | | | | |
|---|---|---|---|---|
| 2008/0148225 | A1* | 6/2008 | Sarkar et al. | 717/107 |
| 2008/0155504 | A1* | 6/2008 | Cheung | 717/120 |
| 2008/0155508 | A1* | 6/2008 | Sarkar et al. | 717/126 |
| 2009/0100415 | A1* | 4/2009 | Dor et al. | 717/131 |

OTHER PUBLICATIONS

European Search Report issued in Application No. 09252791.0, mailed Jun. 28, 2010, 2 pages.

European Search Report issued in Application No. 09252791.0, mailed May 10, 2010, 7 pages.

Sundman, Joel, Impact Analysis With Rational Architecture Management Tools, Source—http://www.ibm.com/developerworks/rational/library/apr07/sundman/index.html, pp. 1-12, Apr. 15, 2007.

Arnold, Robert S., Software Change Impact Analysis, Source—downloaded from http://portal.acm.org/citation.cfm?id=525066, published 1996, pp. 1-389, IEEE Computer Society Press, Los Alamitos, CA.

Mens, Tom, D'Hondt, Theo, Automating Support for Software Evolution in UML, published 2000, pp. 39-59, Kluwer Academic Publishers, Hingham, MA.

Microfocus, Analyzer Express, pp. 1-3, dated 2001-2009, www.MicroFocus.com.

SEEC-Application Manager, p. 1, SEEC, dated 2009. www.seec.com.

Klocwork, p. 1, dated 2009, www.klocwork.com.

CAST Application Intelligence Platform, pp. 1-2, downloaded Mar. 9, 2009, www.castsoftware.com.

Application Management/Analysis, MicroFocus p. 1, dated 2009, www.MicroFocus.com.

Sarkar, Santonu, Panayappan, Arun, Formal Architecture Modeling of Business Application—Software Maintenance Case Study, pp. 1-6, Nov. 2008, self-published.

* cited by examiner

| No. | Subsystem | Component Identifier | Services Affected | Connector Affected | Change Type | Component Change Type | Level of Difficulty | Weight |
|---|---|---|---|---|---|---|---|---|
| 1 | CM Database | AccountManagement | | | Database | Database Schema Change | Complex | 0.5 |
| 2 | CM Database | AccountManagement | | | Database | Database Scalability Change | Complex | 0.4 |
| 3 | CM Database | AccountManagement | | | Database | Database Data Volume Change | Complex | 0.7 |
| 4 | CM Database | AccountManagement | | | Database | Database Table Structure Change | Medium | 0.8 |
| 5 | BizServices | BusinessService | FreeDialCustomer | | BizLogic | Business Logic/Service - Retire | Medium | 0.9 |
| 6 | BizServices | Customer | Paid Dial Customer | | BizLogic | Business Logic/Service - Change | Medium | 1 |
| 7 | BizServices | Customer | ChangeBilling | | BizLogic | Component Code Change | Medium | 1 |
| 8 | BizServices | Customer | ChangeBillPlan | | BizLogic | Component Retire | Complex | 0.2 |
| 9 | BizServices | | | Customer->BillPlan | | Customer to Bill Plan Connection Change | Simple | 0.6 |
| 10 | BizServices | | | Customer->Billing | | Customer to Billing Connection Add | Complex | 0.5 |
| 11 | AccountManagerWebApp | User Management | | | UI | Field Removal | Complex | 0.7 |
| 12 | AccountManagerWebApp | User Management | | | UI | Field Affected | Complex | 0.5 |
| 13 | AccountManagerWebApp | User Management | | | UI | State Field Affected | Complex | 0.6 |
| 14 | AccountManagerWebApp | User Management | | | UI | New Validation | Complex | 0.4 |
| 15 | AccountManagerWebApp | User Management | | | UI | Static fields | Complex | 0.5 |
| 16 | AccountManagerWebApp | User Management | | | UI | Dynamic Fields | Medium | 0.2 |
| 17 | AccountManagerWebApp | | | | UI | Navigation Change | Complex | 0.4 |
| 18 | AccountManagerWebApp | | | | UI | Technology Change | Medium | 0.6 |
| 19 | Enterprise | | | | Integration | Technology Change | Complex | 0.8 |
| 20 | Enterprise | | | | Integration | Message Transformation Change | Complex | 0.9 |
| 21 | Enterprise | | | | Integration | New Adapter Siebel | Simple | 0.4 |
| 22 | BizProcessSubsystem | | | | Integration | New Interface Existing Adapter | Complex | 0.5 |

Figure 7

IMPACT ANALYSIS OF SOFTWARE CHANGE REQUESTS

This application claims priority under 35 U.S.C. §119 to Indian Patent Application No. 2621/MUM/2008, filed Dec. 15, 2008, the entire contents of which are hereby incorporated herein by reference.

TECHNICAL FIELD

The present disclosure relates generally to software and specifically to software maintanence.

BACKGROUND

Software programs may be modified over time. For example, functionality may be added to, removed from, or altered in a software program. The modifications may be to correct programmatic errors in the software program or to implement enhancements to the software program. Requests to modify the software program may be written in a document called a change request.

Software developers may analyze the change request and modify the software program accordingly. One or more software developers may first estimate the degree of effort that may be expanded in order to modify the software program. The degree of effort may be useful, for example, to schedule the implementation of the change request. The degree of effort may also be useful, for example, to provide a customer with a cost estimate for implementing the change request.

To determine the degree of effort, the impact on the software program caused by implementing the change request may be analyzed. The process of determining the impact on the software program is known as impact analysis.

However, the software developer estimating the degree of effort may be inexperienced, unfamiliar with the source code of the software program, only familiar with a limited portion of the source code, or any combination thereof. The software program may have hundreds of thousands of lines of code or even millions of lines of code. Consequently, the estimation of the degree of effort to modify the software program may be difficult to accurately determine.

BRIEF SUMMARY

According to a first aspect, a system may determine an impact of an implementation of a change request on a software program. The system may include an architecture model of the software program that includes components, such as functional components. The system may determine one or more identified changes from the change request, where each of the identified changes identifies a corresponding change in the software program that may be made in order to implement the change request. The system may determine component impacts based on the identified changes. Each of the component impacts corresponds to a respective one of the components to be impacted in the implementation of the change request, where each of the component impacts includes a degree of effort to be expended by a developer in order to implement at least a portion of a corresponding one of the identified changes.

In a second aspect, a method may be provided to determine an impact of an implementation of a change request on a software program. An architecture model of the software program may be provided that includes components, such as functional components. A keyword may be associated with a component. In one example, the keyword may be associated with the component in the architecture model. Alternatively or in addition, the keyword may be associated with the component in a keyword database. An identified change requested in the change request may be determined that includes a change type, which indicates a type of change requested in the identified change. The keyword may be found in the change request. A component impact may be determined based on the identified change and based on the architecture model of the software program. The component impact may correspond to the component and may include a degree of effort to implement at least a portion of the identified change.

In a third aspect, a computer readable medium may be provided to determine an impact of an implementation of a change request on a software program. Computer executable instructions may be included on the computer readable medium. The instructions may retrieve a component included in an architecture model of the software program, where the component is associated with a keyword. The instruction may determine a component type of the component. The component type may be one of multiple component types included in a type system used to model the software program. The instructions may find the keyword in the change request. The instructions may determine a component impact based on the component and the component type, where the component impact includes a degree of effort to modify the component in order to implement the change request.

The present invention is defined by the following claims, and nothing in this section should be taken as a limitation on those claims. Further aspects and advantages of the invention are discussed below in conjunction with the example embodiments.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

FIG. 7 illustrates an example display screen of component impacts;

DETAILED DESCRIPTION

In one example, a computer includes an architecture model of a software program that is under consideration for estimating the impact of modification. The architecture model may include an abstract, coarse-grained model of the software program. The architecture model may include components that have attributes. The attributes may describe properties of a component such as the number of lines of code included in the component and a list of components that depend on that component. A user may enter a change request into the computer. The computer may search the text of the change request for relevant keywords. The keywords may be associated with one or more components that are included in the architecture model. The computer may determine a degree of effort to implement the change request based a comparison of the attributes of the components with predetermined threshold values, where the components are associated with the keywords. For example, making a change to a component with no other components that depend on the component may be easier than making a change to a component with more than 5 dependent components. In other examples, the computer may determine the degree of effort to implement the change request based on alternative and/or additional factors.

Figure 1:
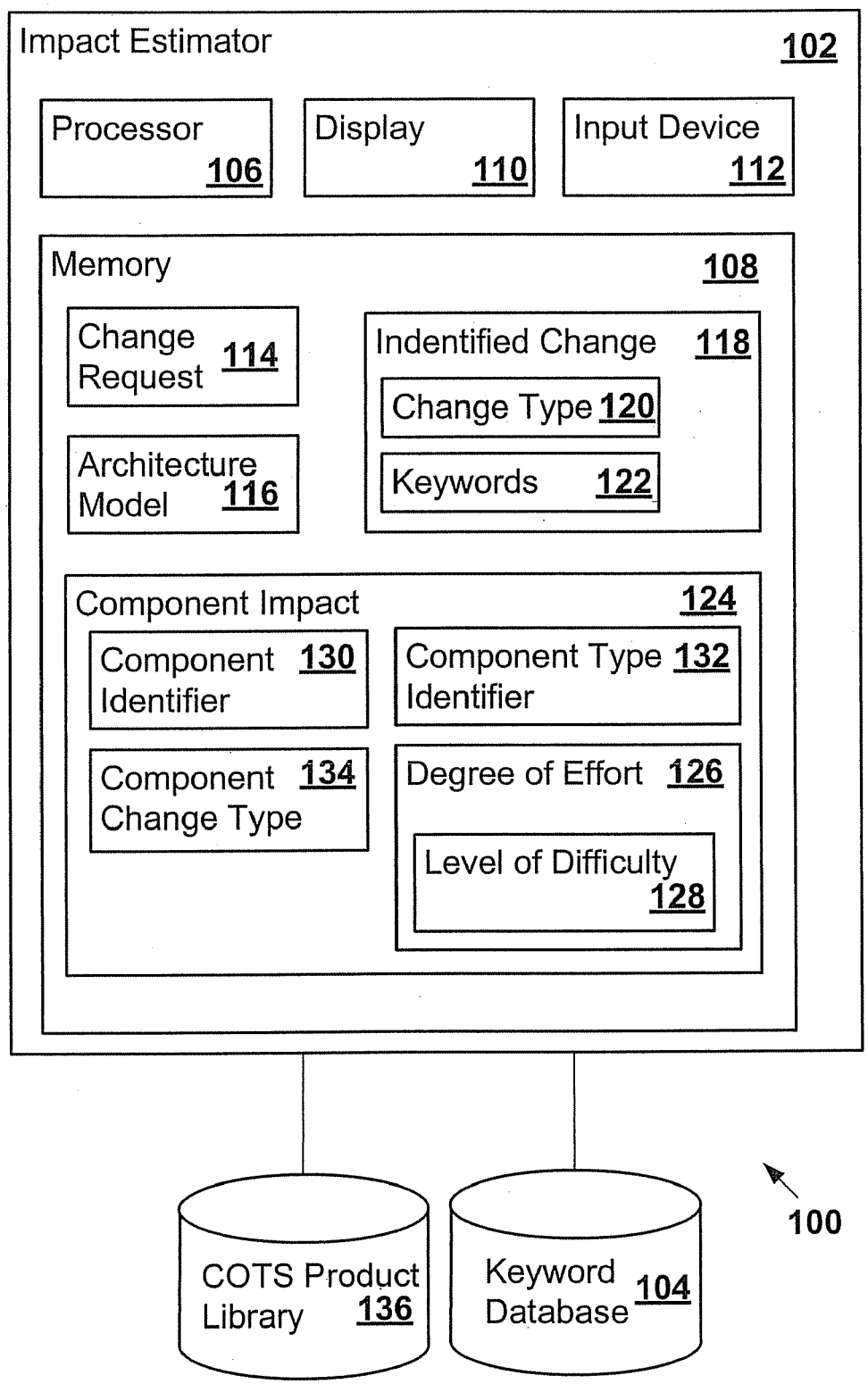
FIG. 1 illustrates an example of a system to determine the degree of effort to implement a change request.

FIG. 1 illustrates an example of a system 100 to determine the degree of effort to implement the change request. The system 100 may include an impact estimator 102 and a keyword database 104. The system 100 may include more, fewer, or different components. For example, the system 100 may include the impact estimator 102, but not the keyword database 104. In a different example, the system 100 may include a network (not shown) over which the impact estimator 102 communicates with the keyword database 104.

The impact estimator 102 may be any device or combination of devices that determines the degree of effort to implement the change request. The impact estimator 102 may include a processor 106, a memory 108, a display 110, and an input device 112. The impact estimator 102 may include more, fewer, or different components. For example, the impact estimator 102 may include a web browser client and web server, where the web browser client is in communication with the web server over a network. In different examples, the impact estimator 102 may be a computer, a server, a laptop computer, a desktop computer, or a Personal Digital Assistant.

The processor 106 may be in communication with the memory 108. The processor may also be in communication with additional components, such as the display 110 and the input device 112. The processor 106 may be a general processor, central processing unit, server, application specific integrated circuit (ASIC), digital signal processor, field programmable gate array (FPGA), digital circuit, analog circuit, or combinations thereof. The processor 106 may be one or more devices operable to execute computer executable instructions.

The memory 108 may be any now known, or later discovered, data storage device. The memory 108 may be a non-volatile and/or volatile memory, such as a random access memory (RAM), a read-only memory (ROM), an erasable programmable read-only memory (EPROM), or flash memory. The memory 108 may include an optical, magnetic (hard-drive) or any other form of data storage device.

The display 110 may be any electro-optical device for displaying data, such as a liquid crystal display (LCD), a cathode ray tube (CRT), an electro-luminescent display, a plasma display panel (PDP), a vacuum florescent display (VFD), or any other display device. The input device 112 may be any electro-mechanical device, electro-optical device, or any other type of device, now known or later discovered that is configured to convert user inputs into electrical signals such as a mouse, joystick, trackball, camera, keyboard, keypad, wireless device, microphone for voice commands, scroll wheel, button, or touch-screen display.

The memory 108 may include computer code. The computer code may include instructions executable with the processor 106. The computer code may include logic embedded in the instructions. The computer code may be written in any computer language now known or later discovered, such as C++, C#, Java, Pascal, Visual Basic, Perl, HyperText Markup Language (HTML), JavaScript, assembly language, and any combination thereof. The functionality of the impact estimator 102 may be implemented with the computer executable instructions in conjunction with the components included in the impact estimator 102.

The keyword database 104 may include a memory, such as the memory 108 included in the impact estimator 102, with any electronic collection of information stored therein. The information may be organized so that the information may be accessed, managed, and updated. Examples of the keyword database 104 include but are not limited to a Relational Database Management System (RDBMS), an object-oriented database, an extensible markup language (XML) database, a file system, memory structures, or other now known or later developed data organization and storage mechanism. The keyword database 104 may use any type of memory and structure, such as a random access memory (RAM), a read-only memory (ROM), an erasable programmable read-only memory (EPROM), flash memory, optical memory, magnetic (hard-drive or tape) memory or other memory device.

The memory 108 may include a change request 114. The change request 114 may be text that describes a request to modify the software program.

An architecture model 116 may be provided in the memory 108. In a different example, the architecture model 116 may accessed over a network. The architecture model 116 may be generated from the source code of the software program to be analyzed, manually entered, or a combination thereof. The architecture model 116 describes the architecture of a software system using a modeling language. The Institute of Electrical and Electronics Engineers (IEEE) has put forth a standard definition of the architecture of a software system, namely IEEE 1471. According to the IEEE definition, the architecture of a software system is the fundamental organization of the software system embodied in components, the relationships between the components, the relationship with the environment of the software system and the principles governing the design and evolution of the software system. The software system may include the software program or multiple software programs to be analyzed by the impact Estimator 102.

The architecture of the software system may be described using a set of views or perspectives. Examples of views may include an application view and an execution view. The application view describes the software system from a functional perspective by describing functional subsystems and the interaction of the functional subsystems. The execution view describes the system from a runtime or execution perspective by describing the technology and supporting software infrastructure on which the software program or software programs run. Examples of supporting software infrastructure include an application server, a web server, and a database server. The architecture model 116 may contain one or more architecture views.

The architecture model 116 of the software system may be described using an architecture description language (ADL). An example of an ADL is Acme, developed at Carnegie Mellon University. The architecture model 116 may include one or more components and connectors. Each one of the components may model any computation and may offer one or more services to other components. The component may include ports. The component may offer the services through the ports. Each one of the connectors may model communication between two or more components. The connector may establish rules to govern component interaction. For example, the connector may include rules that determine the type of component ports with which the connector may be attached.

In one example, the connector may include an identification of a protocol and an identification of a connector type.

Each of the components may be associated with a component type. The component type describes the type of the component. Examples of the component type include a "User Interface Component," a "Proxy Component," a "Business Logic Component," a "Database Component," an "Application Server Component," and a "Customer Relationship Management Component." The component may model functionality at any desired level of abstraction. Furthermore, any one of the components may include additional components that model functionality at a lower level of abstraction than the component.

Each of the connectors may be associated with a connector type. The connector type describes the type of the associated connector. Examples of the connector type include a database call connector, an asynchronous messaging connector, a remote procedure call connector, a Hypertext Transfer Protocol (HTTP) connector, and an HTTP-SOAP (Simple Object Access Protocol) connector.

In one example, the system 100 may additionally include a commercial off-the-shelf software (COTS) product library 136. The COTS product library 136 may include a database that includes descriptions of one or more commercial off-the-shelf software products and/or software libraries that may be available to the software program under maintenance. For example, the COTS product library 136 may include a description of a Java application server, an RDBMS, a web server, and/or an asynchronous messaging service. A product described in the COTS product library 136 may be described with product attributes. Examples of products attributes include the name of the product, a COTS product type, a manufacturer name, a version number, and a list of services provided by the product. The COTS product type may describe what type of the product. Examples of the COTS product type include "Application Server," "Database," "Adapter," and "Message Bus." The COTS product type may be stored as a String or as a more complex data structure used to model COTS software products and/or libraries.

In one example, the COTS product library 136 may be included in the architecture model 116. In another example, the COTS product library 136 may be included in the keyword database 104. In still another example, the COTS product library 136 may be a separate component as illustrated in FIG. 1.

During operation, the impact estimator 102 may analyze the software program based on the architecture model 116 to determine the degree of effort to implement the change request 114. First, the impact estimator 102 may store the change request 114 in the memory 108. For example, the change request 114 may be received in an e-mail. In response to a user selection made with the input device 112, the impact estimator 102 may store the received change request 114 in the memory 108. In another example, the change request 114 may be received from a Web Service, using a protocol such as Simple Object Access Protocol (SOAP). In yet another example, a user may enter the change request 114 into the memory 108 using the input device 112, such as with a keyboard. One example of an architecture modeling approach is described in the paper entitled "Formal Architecture Modeling of Business Applications-A Software Maintenance Case Study," by Santonu Sarkar and Arun Panayappan, and published at IEEE Tencon Conference, November 2008.

The impact estimator 102 may determine which of the components in the architecture model 116 may be impacted in an implementation of the change request 114 using keyword matching. A keyword or term may be a word, a phrase, a symbol, any other identifier, or any combination thereof.

In one example, components in the architecture model 116 may be directly associated with keywords. The association may be in the architecture model 116 and/or in the keyword database 104. If the keyword is found in the change request 114, then each of the components that are associated with the keyword may potentially be impacted.

Alternatively or additionally, the keyword may be associated with one or more business scenarios. Each of the business scenarios may describe a use of the software program. The business scenarios may be referred to as business use cases, or use cases. Each of the business scenarios may be implemented by one or more of the components. Examples of the business scenarios include changing a customer address, identifying products to purchase, ordering the products, billing for orders placed, provisioning of sold products, and managing customer relationships. In one example, one or more keywords associated with the business scenarios may be stored in the architecture model 116. The one or more keywords may be stored as one or more attributes of the business scenarios in the architecture model. In another example, keywords associated with the business scenarios may be stored in the keyword database 104. The association may be in the architecture model 116 and/or in the keyword database 104.

If the keyword is found in the change request 114, then the impact estimator 102 may determine the business scenario or business scenarios that are associated with the keyword. The impact estimator 102 may determine that each of the components implementing the associated business scenario(s) are impacted. Therefore, these components may be considered to be indirectly associated with the keyword.

In one example, the impact estimator 102 may determine an identified change 118 or a set of identified changes based on the keyword search of the change request 114. The identified change 118 may identify a change type 120 and at least one of the keywords 122 that are included in change request 114. The change type 120 may describe a type of change requested in the change request 114. For example, the impact estimator 102 may parse the change request 114 to find each of the sentences included in the change request 114. The impact estimator 102 may analyze each of the sentences separately. In analyzing a sentence, if keywords indicating that the sentence relates to a change are found in the sentence, or the number found exceeds a predetermined threshold, then the sentence may include a request to change the software program. Alternatively or additionally, the impact estimator 102 may search the sentence for keywords that indicate the type of change requested in the sentence. For example, the keywords may indicate that the sentence requests one or more of the following types of changes: a business logic/flow change, a database change, an external system integration change, a user interface change, or an infrastructure change. The impact estimator 102 may store the identified change 118 corresponding to each respective one of the types of the changes requested in the sentence. The identified change 118 may include the change type 114 and the keywords 122 included in the sentence. In one example, the keywords 122 included in the identified change 118 may be the words in the sentence. In another example, the keywords 122 included in the identified change 118 may include keywords in the sentence that are associated directly or indirectly with components in the architecture model 116. In still another example, the keywords included in the identified change 118 may be all of the words in the change request 114. The keywords 122 included in the identified change 118 may or may not include the keywords that identified the sentence as requesting a change or that identified the type of change requested in the sentence. In one example, the identified change 118 may include a pointer to the sentence.

The impact estimator 102 may use the identified change 118 or set of identified changes to determine which of the components in the architecture model 116 may be impacted by an implementation of the change request 114. For example, instead of just matching the keywords 122 in the identified change 118 with associated components in the architecture model 116, the impact estimator 102 may further limit the impacted components to those components to which the change type 120 is applicable. For example, if the component is a "Database Component" component and the change type 120 is a user interface change, the component may not be impacted when implementing the identified change even if the component is associated with one of the keywords 122.

The impact estimator 102 may determine a component impact 124 corresponding to a respective one of the components that may be impacted when implementing the change request 114. The component impact 124 may represent an impact on the corresponding component when implementing the change request 114. The component impact 124 may include a degree of effort 126 to implement at least a portion of the change request 114 with respect to the corresponding component. For example, the degree of effort 126 may include a level of difficulty 128, such as "easy," "medium difficulty," and "hard." In other examples, the level of difficulty 128 may be "Simple," "Medium," and "Complex." The impact estimator 102 may determine the degree of effort 126 using heuristics as described later.

Alternatively or additionally, the degree of effort 126 may include a number of hours a developer would expend to implement the change request 114 with respect to the corresponding component. In one example, the component impact 124 may include a component identifier 130 and/or a component type identifier 132. The component identifier 130 may be any identifier to identify the component corresponding to the component impact 124. The component type identifier 132 may be any identifier to identify the component type of the component.

In one example, the component impact 124 may include a component change type 134. The component change type 134 may indicate the type of change to be made to the component. For example, the component change type 134, may be to affect a User Interface (UI) field, to add a complex UI, to drop a database field, or any other type of change that may be made to the component.

The impact estimator 102 may also determine more than one component impact 1124 for each of the components that may be impacted. In one example, the impact estimator 102 may determine the component impact 124 based on the component identified by the component identifier 130. For example, the component impact 124 may be based on attributes of the component. The attributes are discussed later in reference to FIG. 2. In a second example, the impact estimator 102 may determine the component impact 124 based on the component and the change type 120. The change type 120 may, for example, be included in the identified change 118. Alternatively, the change type 120 may be determined from the component type of the component. For example, there may be a mapping between change types 120 and component types. The mapping may be one to many, many to one, one to one, or many to many. The impact estimator 102 may use the mapping to determine which change type 120 or change types are applicable to the component type identified by the component type identifier 132. The determination of the component impact 124 or component impacts is described later.

After determining the component impacts, the impact estimator 102 may determine an overall impact of implementing the change request 114. For example, the impact estimator 102 may determine the overall impact by summing the hours included in the degree of effort 126 of each of the component impacts.

Figure 2:
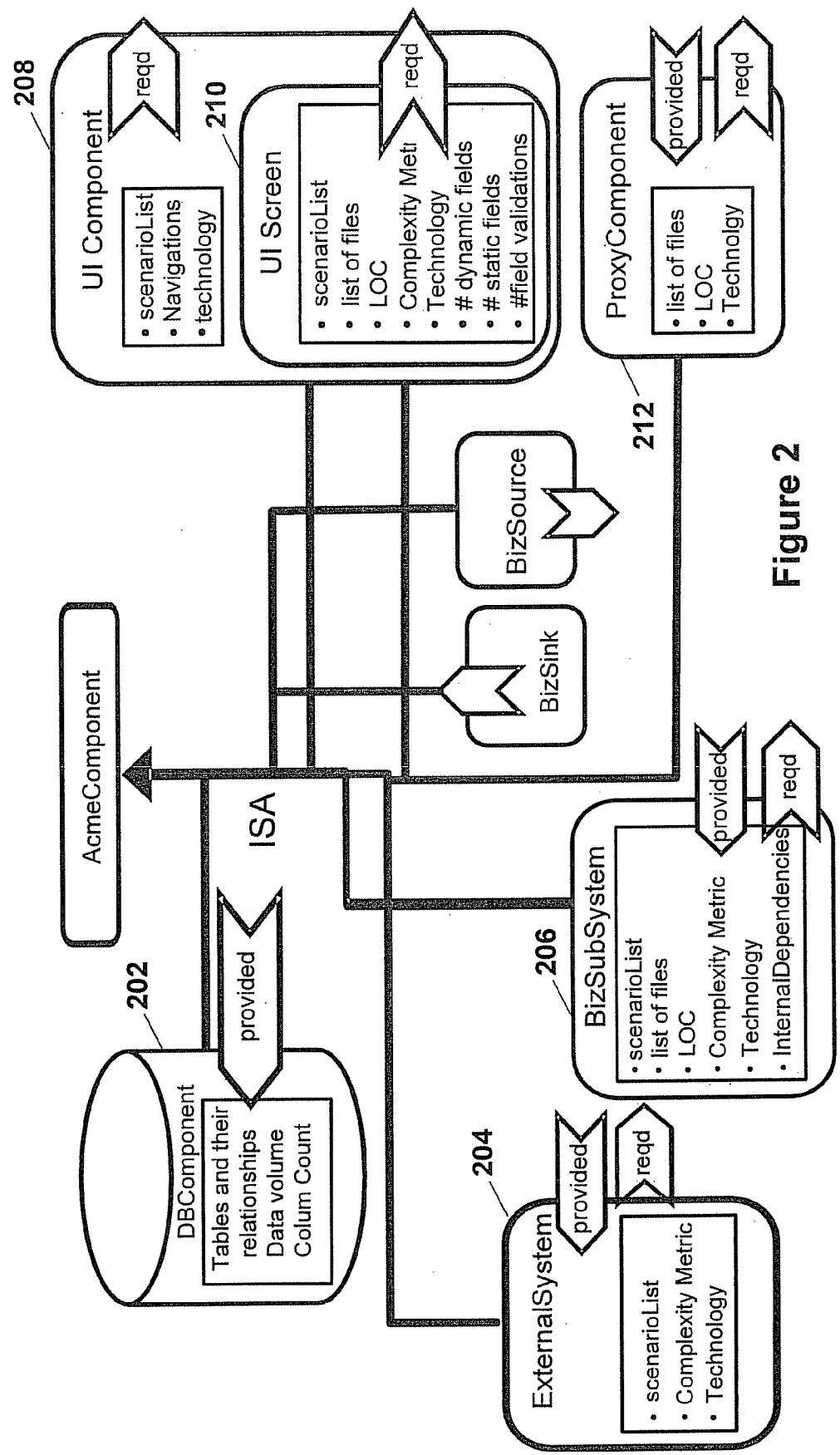
FIG. 2 illustrates an example of component types included in an architecture model.

FIG. 2 illustrates an example of the component types included in the architecture model 116. In the example illustrated in FIG. 2, the component types include a "Database Component" 202, an "External System" 204, a "Business Object Subsystem" 206, a "User Interface (UI) Component" 208, a "UI Screen Component" 210, and a "Proxy Component" 212. The "Database Component" 202 may represent entities stored in a database, such as one or more tables in an RDBMS. The "External System" 204 may represent software used by the software program, but external from the perspective of the software program or software programs that are the focus of the architecture model. For example, the "External System" 204 may be a messaging service provided by an operating system and used by a business application. The "Business Object Subsystem" 206 may represent a program object or collection of programs objects implementing business logic. The "UI Component" 208 may represent a collection of user interface display pages used by a user of the software program. A component of the type "UI Component" 208 may include one or more components of the type "UI Screen Component" 210. The "UI Screen Component" 210 may represent a user interface display page included in the user interface display pages. The "Proxy Component" 212 may represent an object that acts as a proxy object. A proxy object may translate a first application programming interface (API) to a second API.

Each of the component types may identify attributes of components of the respective one of the component types. For example, the component of the type database base component 202 may include the following attributes: tables, relationships between the tables, a count of the columns on each of the tables, and a data volume count that indicates the amount of data in each of the tables. The component of type "External System" 204 may include the following attributes: a list of business scenarios that use the component, a complexity metric, and a technology identifier. The complexity metric may be any now known or later discovered measurement of complexity, such as Cyclomatic Complexity or Maintainability Index (MI). For example, the complexity metric may indicate the degree of complexity involved in programmatically interacting with the component. The technology identifier may identify the type of technology provided by the "External System". For example, the technology identifier may be "asynchronous messaging." The component of the type business logic subsystem 206 may include the following attributes: a list of business scenarios that use the component, a list of source code files associated with the component, the number of lines of code included in the source code files, a complexity metric, a technology identifier, and a list of internal dependencies between services provided by the component. The component of the type "UI Component" 208 may include following attributes: a list of business scenarios that use the component, page navigations between components of the type "UI Screen Component" 210, and a technology identifier. The component of the type "UI Screen Component" 210 may include the following attributes: a list of business scenarios that use the component, a list of source files used to implement the display page represented by the component, the number of lines of code included in the source files, a complexity metric, a technology identifier, a number of static fields included on the display page, a number of dynamic fields included on the display page, and a number of field validations performed in connection with the display page. The component of the "Proxy Component" 212 may include the following attributes: a list of source files used to implement the component, the number of lines of code included in the source files, and a technology identifier. In different examples, the architecture model 116 may include more, fewer, or different component types and each of the component types may include more, fewer, or different attributes.

Figure 3:
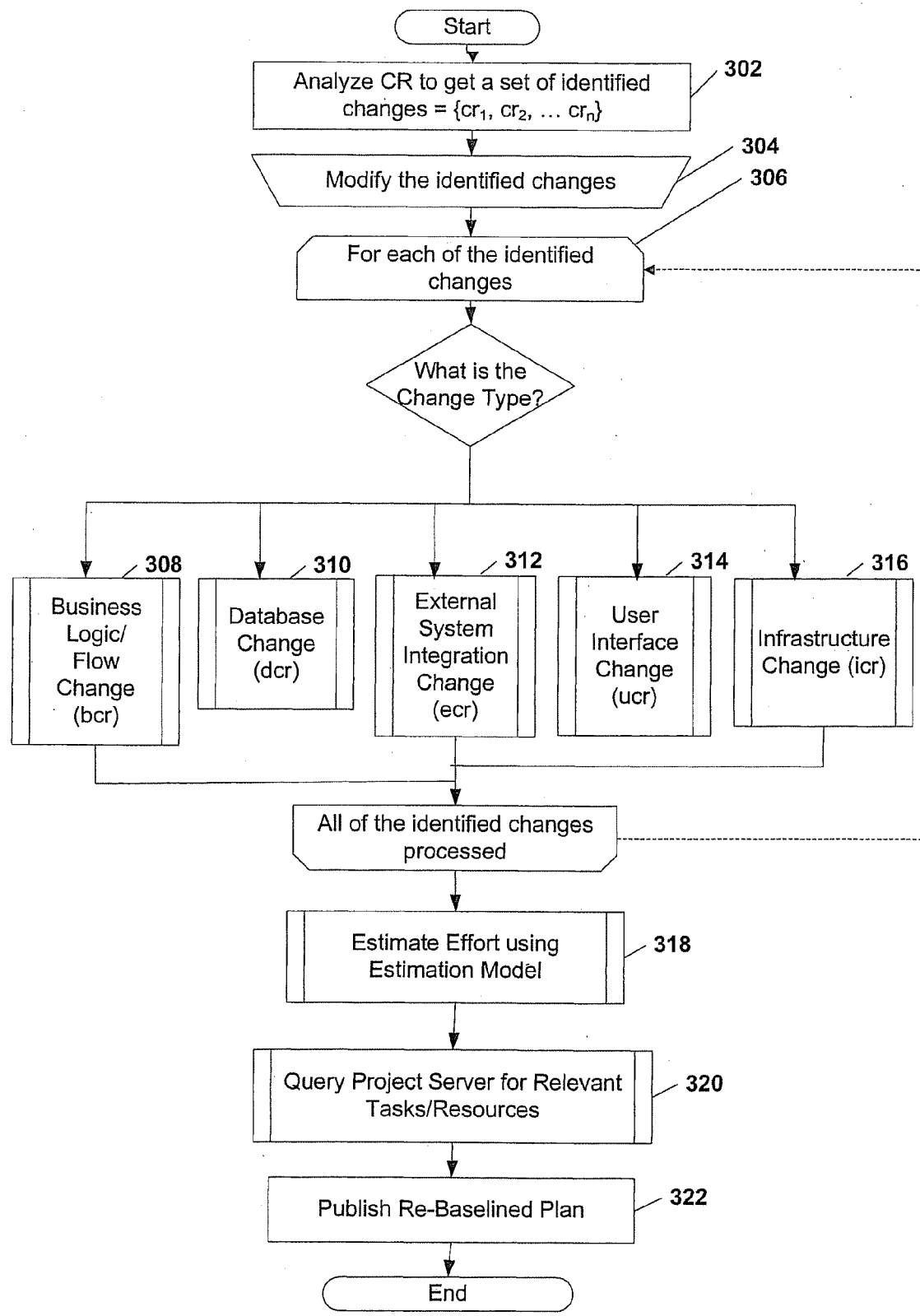
FIG. 3 illustrates a first example of a method to determine the impact of implementing the change request.

FIG. 3 illustrates an example of a method to determine the impact of implementing the change request 114. Using this method in an automated or semi-automated operation, the impact estimator 102 may determine the component impact 124 or component impacts in response to the change request 114.

In step 302, the impact estimator 102 may determine a set of identified changes 118 as described earlier. In step 304, the impact estimator 102 may display the identified changes 118. The user may optionally modify the set of identified changes 118 by making selections with the input device 112.

The impact estimator 102 may iterate through each of the identified changes 118 starting in step 306. Depending on the change type 120 of the identified change 118, the impact estimator 102 may use a different methodology to determine one or more component impacts 124 from the identified change 118. Each of the different methods is represented by a corresponding one of the steps 308, 310, 312, 314, and 316. Examples of such methods are described later.

In step 318, the impact estimator 102 may determine an overall degree of effort based on the degree of effort 126 included in each of the component impacts 124. Where the degree of effort 126 includes the level of difficulty 128, the impact estimator 102 may use an estimation model to calculate, for example, a number of developer hours that correspond to the level of difficulty 128.

In one example, the impact estimator 102 may display the component impacts 124 or a portion of the component impacts 124. For example, the impact estimator 102 may display an output on the display 110 similar to the example display screen illustrated in FIG. 7.

The impact estimator 102 may make further use of the information included in the component impacts 124. For example, in step 320, the impact estimator 102 may query a project server for relevant resources and create relevant tasks of a project plan in the project server. For example, one of the relevant resources may be a developer whose expertise is on the component identified by the component identifier 130 of one of the identified changes 118. The impact estimator 102 may create a task for the developer for the appropriate length of time, where the task corresponds to the identified change 118. Additionally, or alternatively, the impact estimator 102 may create tasks corresponding to one or more of the component impacts 124, where the tasks conform to a predetermined standard, such as a naming standard or a standard delivery methodology. The impact estimator 102 may query the project server for any matching tasks, where the matching tasks have common names or share one or more other common attributes such as a resource assigned to the tasks. If one of the tasks does not have a corresponding matching task, the user may be prompted to determine whether the task should be manually modified or whether the task should added as a new task without further modification. The project server may prompt the user to re-baseline the project plan after the tasks are created and/or matched with existing tasks.

In step 322, a project plan may be published based on the tasks created by the impact estimator 102 in the project server.

The project server may be any software program that creates and modifies a project plan, where the project plan includes tasks associated with determined time frames and the tasks may be directed to an overall goal of the project plan. An example of the project server includes Microsoft® Project Server from Microsoft Corporation of Redmond, Wash. In one example, the project server may be in communication with the impact estimator 102 over a network. In another example, the project server may be included in the impact estimator 102.

Figure 4:
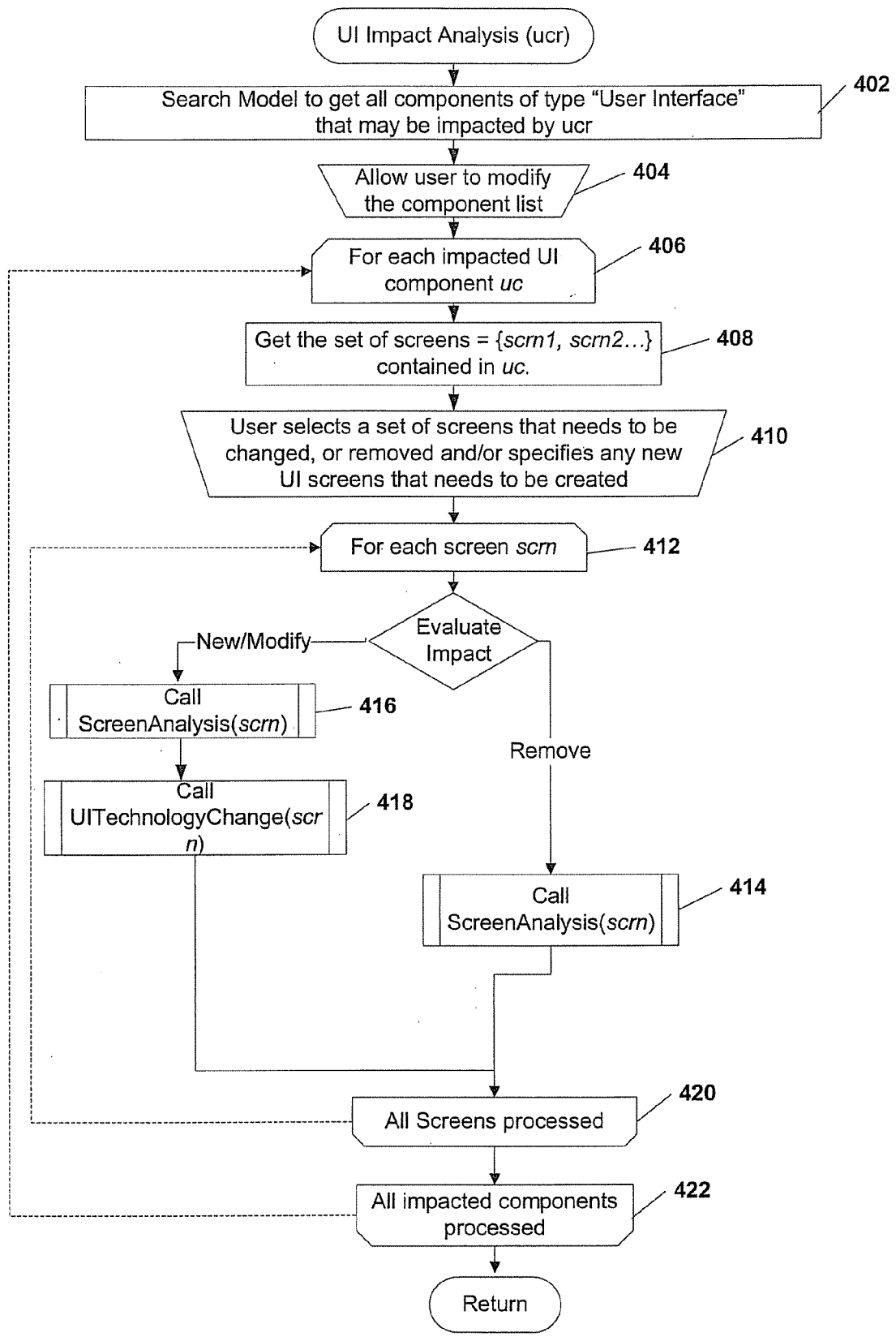
FIG. 4 illustrates a flow diagram of an example operation to create one or more component impacts based on the change type being a user interface change.

FIG. 4 illustrates a flow diagram of an example operation to create one or more component impacts 124 based on the change type 120 being a user interface change. The operation may include more, fewer, or different steps. The steps may be performed in an order different than illustrated in FIG. 4.

The operation may reflect a heuristic solution. For example, the operation may begin in step 402 with the impact estimator 102 searching the architecture model 116 for components that are the type "UI Component" 208 and that are associated with one or more of the keywords 122 in the identified change 118. In step 404, the impact estimator 102 may display the matching components or the attributes of the matching components in the display 110. The user may selectively modify a list of the components or leave the list of the components unchanged.

Each of the matching components may be separately processed starting in step 406. Each of the components is the type "UI Component" 208. Therefore, each of the components may include screen components that are the type "UI Screen Component" 210. The impact estimator 102 may obtain the list of screen components in step 408. The user may selectively modify the list of screen components in step 410. The user may indicate which screen components may be changed or removed. The user may further specify whether one or more new screen components should be added to the list of screen components. The new screen components may not have previously been in the architecture model 116.

Starting in step 412, each of the screen components may be separately processed. If the screen component is to be removed, then the operation may proceed to step 414. In step 414, the impact estimator 102 may read the model to determine whether the screen component includes any fields that add data to a web session, to a database, or to an HTTP request. For each one of these kinds of fields, the impact estimator 102 may create a new component impact 124. The component impact 124 may include the component identifier 130 to identify the screen component, the component change type 134 of an affected state field, and the level of difficulty 128 of medium difficulty. The appropriate level of difficulty 128 may determined based on past experiences and may be configurable. The method may include different and/or additional steps to process the screen component to be removed.

Alternatively, if screen component is to be changed or is new, then the operation may proceed to step 416. In step 416, the impact estimator 102 may determine whether the screen component is a new screen component without any existing UI. If so, then the impact estimator 102 may create a new component impact 124. The component impact 124 may include the component identifier 130 to identify the screen component, the component change type 134 of an addition of a new UI, and the level of difficulty 128 of difficult.

From step 416, the operation may proceed to step 418. In step 418, the impact estimator 102 may determine whether the screen component is new. If so, the impact estimator 102 may search the architecture model 116 for available technologies. The impact estimator 102 may display the list of technologies. The user may either select a technology from among the list of technologies or specify a new one. If the user selects a new technology, the impact estimator 102 may create a new component impact 124. The component impact 124 may include the component identifier 130 to identify the screen component, the component change type 134 of a new technology change, and the level of difficulty 128 of difficult. However, if the user selects a technology from the list of existing technologies, the impact estimator 102 may create a new component impact 124 with different values. For example, the component impact 124 may include the component identifier 130 to identify the screen component, the component change type 134 of a technology change, and the level of difficulty 128 of medium.

The operation may include different and/or additional steps to analyze a new or modified screen component. For example, in one step, the impact estimator 102 may determine whether a navigation change would occur based on user input and based on the attribute of the parent "UI Component" 208 that describes navigations between components of the type "UI Screen Component" 210. A corresponding new component impact 124 may be created if the navigation change would occur. If the number of navigation changes exceeds a threshold amount, the level of difficulty 128 may increase. Additionally or alternatively, in one step, the impact estimator 102 may compare the number of fields on the screen component that require validation with a threshold value. If the threshold value is exceeded, then the impact estimator 102 may create a new component impact 124 that indicates an impact to the screen component may be a difficult field validation change. By using various attributes on the screen component and/or the parent UI component, the impact estimator 102 may create component impacts 124 that include various component change types 134 and various levels of difficulty 128.

In step 420, the operation may return to step 412 to repeat for each of the screen components of the parent UI component. In step 422, the operation may return to step 406 to repeat for each of the matching components that are UI components 202.

Figure 5:
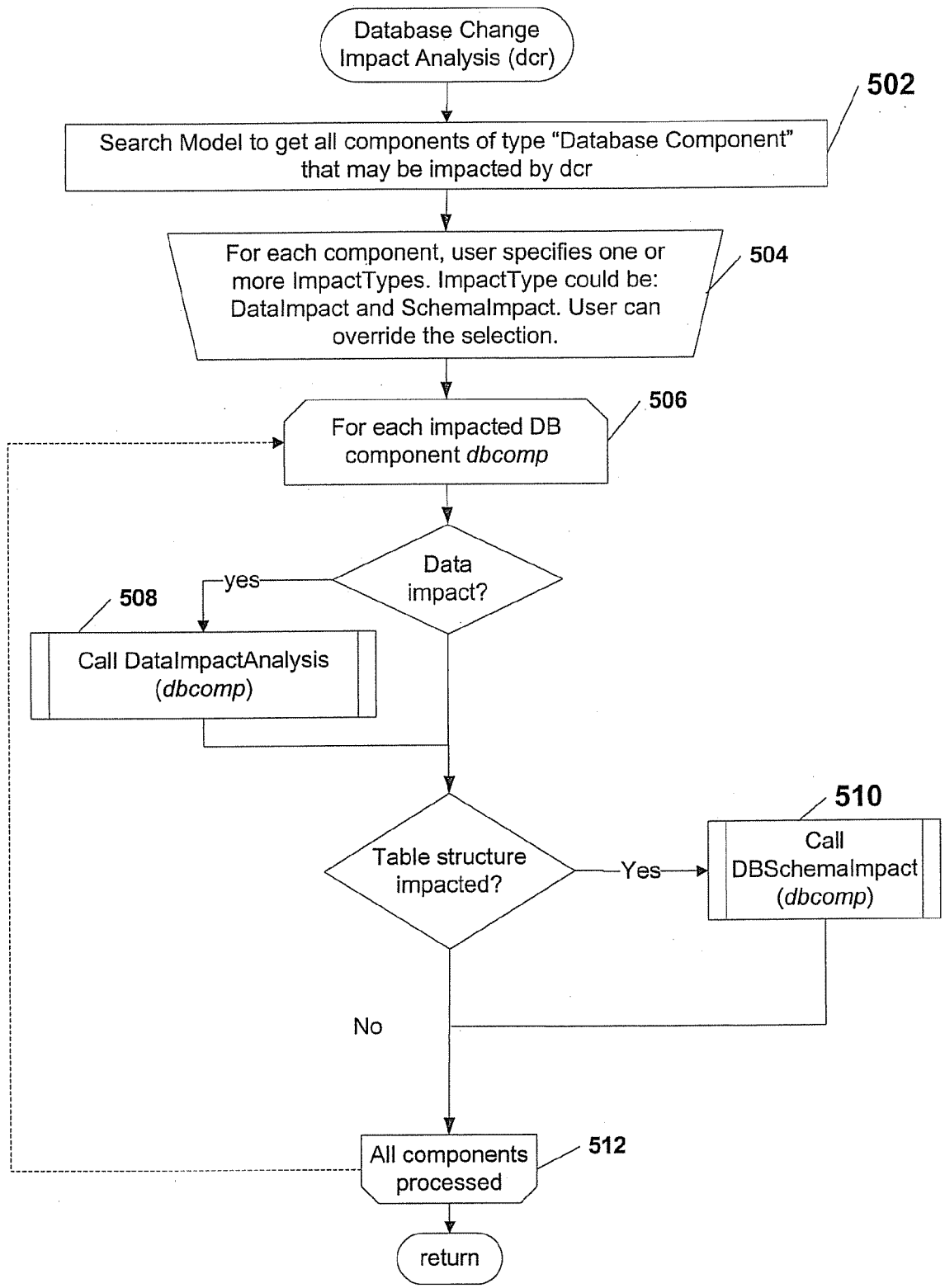
FIG. 5 illustrates a flow diagram of an example operation to create one or more component impacts based on the change type being a database change.

FIG. 5 illustrates a flow diagram of an example operation to create one or more component impacts 124 based on the change type 120 being a database change. The operation may include more, fewer, or different steps. The steps may be performed in an order different than illustrated in FIG. 5.

The operation may begin in step 502 by the impact estimator 102 searching the architecture model 116 for components that are the type "Database Component" 202 and that are associated with the keywords 122 in the identified change 118. In step 504, the impact estimator 102 may display the matching components. Additionally the user may specify whether a change to the component impacts data, whether the change impacts the schema of the database, or both for each of the matching components.

Starting in step 506, each of the matching components may be processed separately. If the data of the matching component is impacted, the operation may proceed to step 508. In step 508, the impact estimator 102 may determine, based on the attribute of the component that identifies tables and based on the attribute that identifies the amount of data in each of the tables, whether the total amount of data in the tables exceeds a predetermined threshold. If so, the impact estimator 102 may create a new component impact 124 that includes the component identifier 130 that identifies the component, the component change type 134 of a data volume change, and the level of difficulty 128 of difficult.

In step 510, if the change impacts the schema, then the impact estimator 102 may determine whether the number of impacted columns in the tables exceeds a predetermined threshold. If so, the impact estimator 102 may create a new component impact 124 that includes the component identifier 130 that identifies the component, the component change type 134 of a schema change, and the level of difficulty 128 of difficult. For example, where the number of columns is less than a lower predetermined threshold, the level of difficulty 128 may be easy.

In step 512, the operation may return to step 506 until all of the matching components are processed. At that time the operation may complete.

Referring again to FIG. 3, operations corresponding to the business logic/flow change, the external system integration change, and the infrastructure change in steps 308, 312, and 316 respectively may be similarly performed. The impact estimator 102 may create one or more component impacts 124 based on the matched components, the architecture model 116, attributes of components in the architecture model 116, user input received from the input device 112, or any combination thereof.

Figure 6:
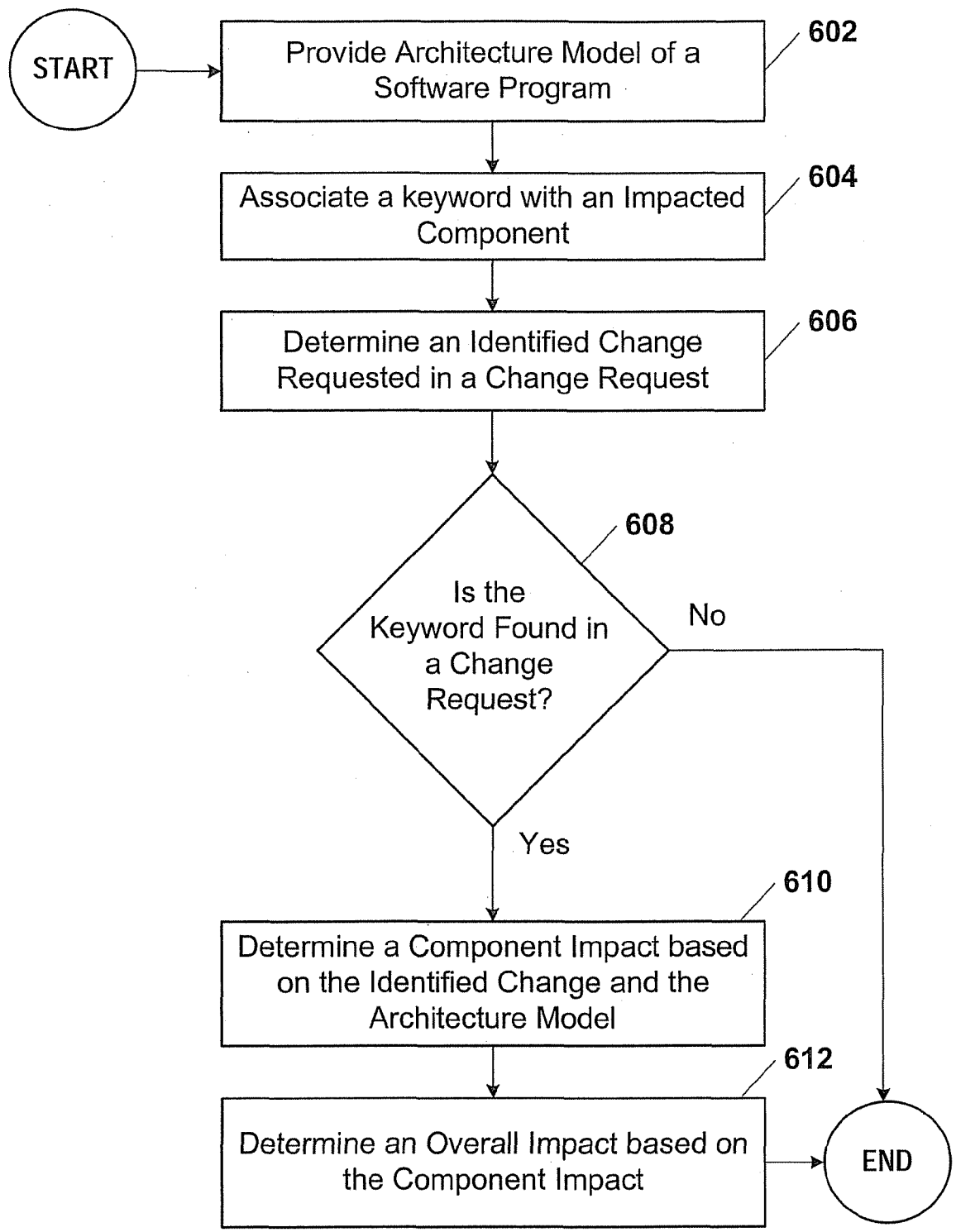
FIG. 6 illustrates a second example method to determine the impact of a change request on a software program.

FIG. 6 illustrates an example method to determine an impact of the change request 114 on the software program. The method may include more, fewer, or different steps than illustrated in FIG. 6. The steps may be performed in an order different than described.

The method may begin in step 602 by providing the architecture model 116 of the software program. The architecture model 116 may include multiple components. The method may continue in step 604 by associating the keyword with the impacted component that is included among the components. For example, the keyword may be a property of the impacted component in the architecture model 116. In a different example, the keyword may be associated with the impacted component in the keyword database 104. In another example, the method may include steps to associate additional keywords with one or more of the components.

In step 606, the method may continue by determining the identified change 118 requested in the change request 114. The identified change 118 may include the change type 120 that indicates the type of change requested in the identified change 118.

In step 608, the method may continue by finding the keyword in the change request 114. If the keyword is found, the method may continue to step 610. If the keyword is not found, the method may complete. In a different example, if the keyword is not found, the method may search for the additional keywords that are associated with one or more of the components.

In step 610, the method may proceed by determining the component impact 124 based on the identified change 118 and based on the architecture model 116 of the software program. The component impact 124 may include the degree of effort 126 to implement at least a portion of the identified change 118.

In step 612, the method may include determining an overall impact based on the component impact 124. Additionally, determining the overall impact may include determining the overall impact based on multiple component impacts.

A set of keywords in the keyword database 104 may be indicative of a concept such as a technology domain, a functional concept, or some other concept. Additional sets of keywords may be indicative of additional technology domains, functional concepts, and/or other concept. The keyword database 104 may include the concepts, the sets of keywords, and associations between each of the sets of keywords and any one or more of the concepts.

The technology domain may indicate a concept related to technology. For example, the technology domain "Database," may be associated with keywords such as "db," "transaction," "record," "table," "commit," or with any other keyword used in connection with databases. Similarly, "UI" may be a technology domain concept associated with a set of keywords including "jsp," "aspx," "html," "userinterface," "combobox," or any other keyword used in connection with user interfaces.

The functional concept may indicate a concept related to functionality in one or more software programs. For example, a set of keywords that includes "user," "customer," and "goldcustomer" may be indicative of a customer. A second example set of keywords may include "account," "savings," and "checking" and be indicative of the functional concept of a bank account in the context of a banking application.

A relationship may exist between two or more concepts. For example, the concept "Customer" may be related to the concept "Account." The concepts, relationships between the concepts, keywords, and associations between the keywords and the concepts may be stored in any now known or later discovered format in the keyword database 104. Additionally, ontology may be used to model concepts more formally. The resulting model of the concepts may be stored in the keyword database 104.

The keyword database 104 may be divided into multiple databases. For example, the keyword database 104 may include a technology domain database to store information about technology domains and a functional concept database to store information about functional concepts.

The technology domain database may be independent of the functional concept database. For example, the technology domain database may be used in the context of a Telecom, or a Banking or a Retail application. For example, the technology domain database may be created for "UI", "BusinessLogic", "Database", "ExternalIntegration" component types and used with any software program modeled using such component types.

The functional concept database may be constructed for a predetermined application domain, such as Telecom, Banking or Retail. For example, in the domain of Telecom, functional concepts may include "Billing", "Customer", "DSL" and any other Telecom related keyword. Similarly, in the domain of Banking, functional concepts may include "Interest", "Account", "Loan" and any other Banking related keyword. For each domain, functional concepts may be associated with relevant keywords.

The keyword database 104 may be created manually or semi-automatically. For example, the keyword database 104 may be generated by processing documents such as use case specifications and requirement specifications.

The architecture model 116 may include components that represent functional concepts. For example, the architecture model 116 may include a "BillingManagment" component that handles various types of billing. The "BillingManagement" component may be linked to a set of source code files that implements the functionality of "BillingManagement." The impact estimator 102 may use the keywords stored in the functional concept database to determine how closely the keywords match the "BillingManagment" component. Multiple techniques may be used to determine the closeness. For example, the impact estimator 102 may determine how frequently one of the keywords appears in the set of source code files linked to the component. If the frequency exceeds a determined threshold, such as a user-determined threshold, the keyword may be associated with the component.

The change request 114 may be parsed into a set of sentences. For each of the sentences, the impact estimator 102 may identify verbs that denote a change instruction. For example, the verbs may indicate whether the sentence indicates a change is to add, modify, or retire a feature. Sentences such as "Add a new feature to the Email-Module", "Modify the DSL Billing", "Retire application X" indicates "add," "modify," and "retire" respectively.

To determine the change type 120 of the identified change 118 in the sentence, the impact estimator 102 may use the technology domain database. Determining the change type 102 may be manual, automated, or semi-automated. For example, keyword matching may determine whether the sentence refers to a technology domain associated with one of the change types 120. For example, if one of the keywords 122 is associated with user interface related technologies, then the change type 102 may be the user interface change. When analyzing the identified change 118 with the change type 102 of the user interface change, the impact estimator may limit analysis to components in the architecture model 116 that are user interface type components.

Furthermore, to identify a potential set of components that may be impacted by the identified change 118, the impact estimator 103 may use a text-processing approach and keyword search. For example, keywords 122 that are nouns may be identified. Next, the impact estimator 103 may determine whether the identified keywords 122 are in a list of keywords associated with one of the components or with one of the connectors in the architecture model 116. The matching component and/or connector may be impacted by the change request 114.

In one example, the change request 114 may follow a template instead of using free-form text. Analysis of the change request 114 may be more precise and accurate if fields in the template identify the change type 120 and/or the identified changes 118.

FIG. 7 illustrates an example display screen of component impacts 124. In different examples, the impact estimator 102 may display more, less or different attributes of the component impacts 124 and/or identified changes 118.

Figure 8:
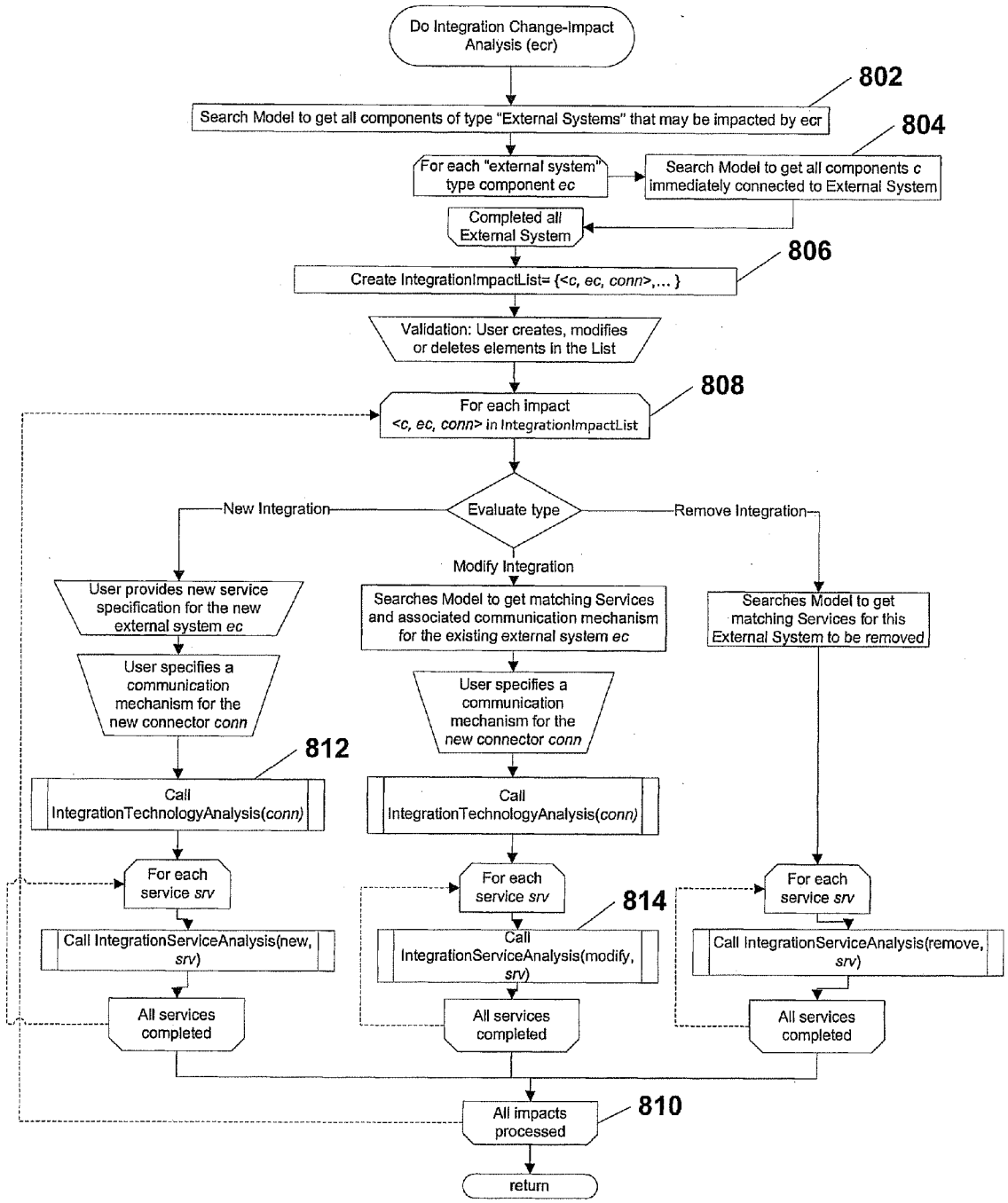
FIG. 8 illustrates a flow diagram of an example operation to create one or more component impacts based on the change type being an external system integration change.

FIG. 8 illustrates a flow diagram of an example operation to create one or more component impacts 124 based on the change type 120 being an external system integration change. The operation may include more, fewer, or different steps. The steps may be performed in an order different than illustrated in FIG. 8. The steps in the operation may be performed as part of step 312 in FIG. 3.

The operation may begin in step 802 by searching the architecture model 116 for components of the type "External System" 204 and that are associated with the keywords 122 in order to determine the impacted "External System" components. In step 804, operation may include searching the architecture model 116 for components immediately connected to the impacted "External System" components in order to determine which components are connected components. One of the components may be immediately connected to another one of the components if both are connected to each other in via the one of the connectors in the architecture model 116.

In step 806, the impact estimator 102 may create an integration impact list. Each of the items in the integration impact list may identify one of the impacted "External System" components, one of the connected components that is connected to the corresponding one of the impacted "External System" components, and the connector connecting the two components.

Figure 9:
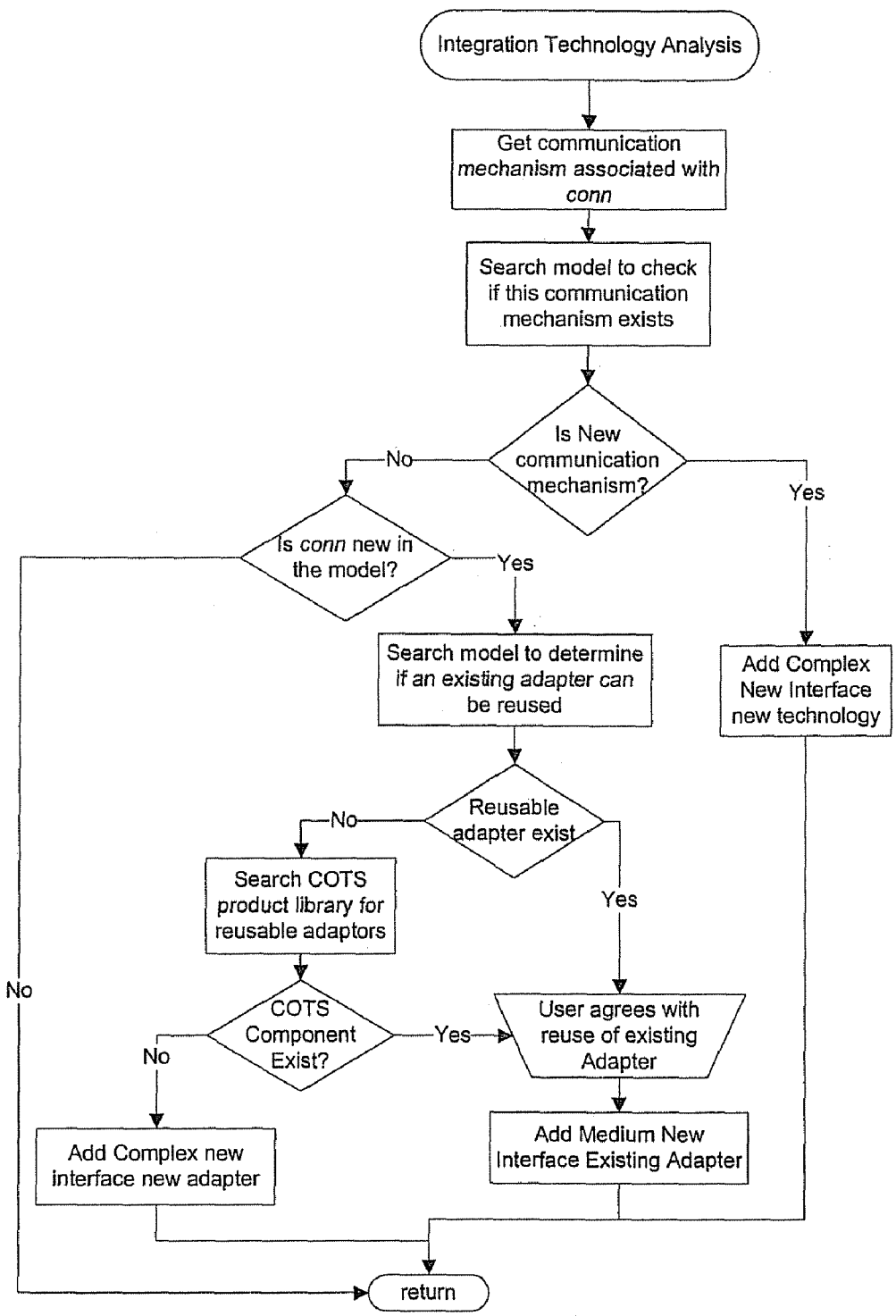
FIG. 9 illustrates a flow diagram of an example operation to create one or more component impacts as part of the integration technology analysis operation.

From step 808 to step 810, each of the items in the integration impact list may be processed separately. For example, in step 812, the connector identified in the item being processed may be the subject of an integration technology analysis operation to determine component impacts 124. An example of such an operation is illustrated in FIG. 9. In another example, in step 814, each of the services associated with the "External System" component identified in the item may be the subject of an integration service analysis operation. An example of such an operation is illustrated in FIG. 10.

FIG. 9 illustrates a flow diagram of an example operation to create one or more component impacts 124 as part of the integration technology analysis operation. The integration technology analysis operation may determine the impact on the component based on whether the connector is an entirely new communication mechanism. Additionally, or alternatively, the integration technology analysis operation may determine the impact on the component based on whether existing code may be reused for services associated with the "External System" component. To do so, the impact estimator 102 may search for the commercial off-the-shelf (COTS) product library 136 for COTS software products and/or libraries that provide such services.

Figure 10:
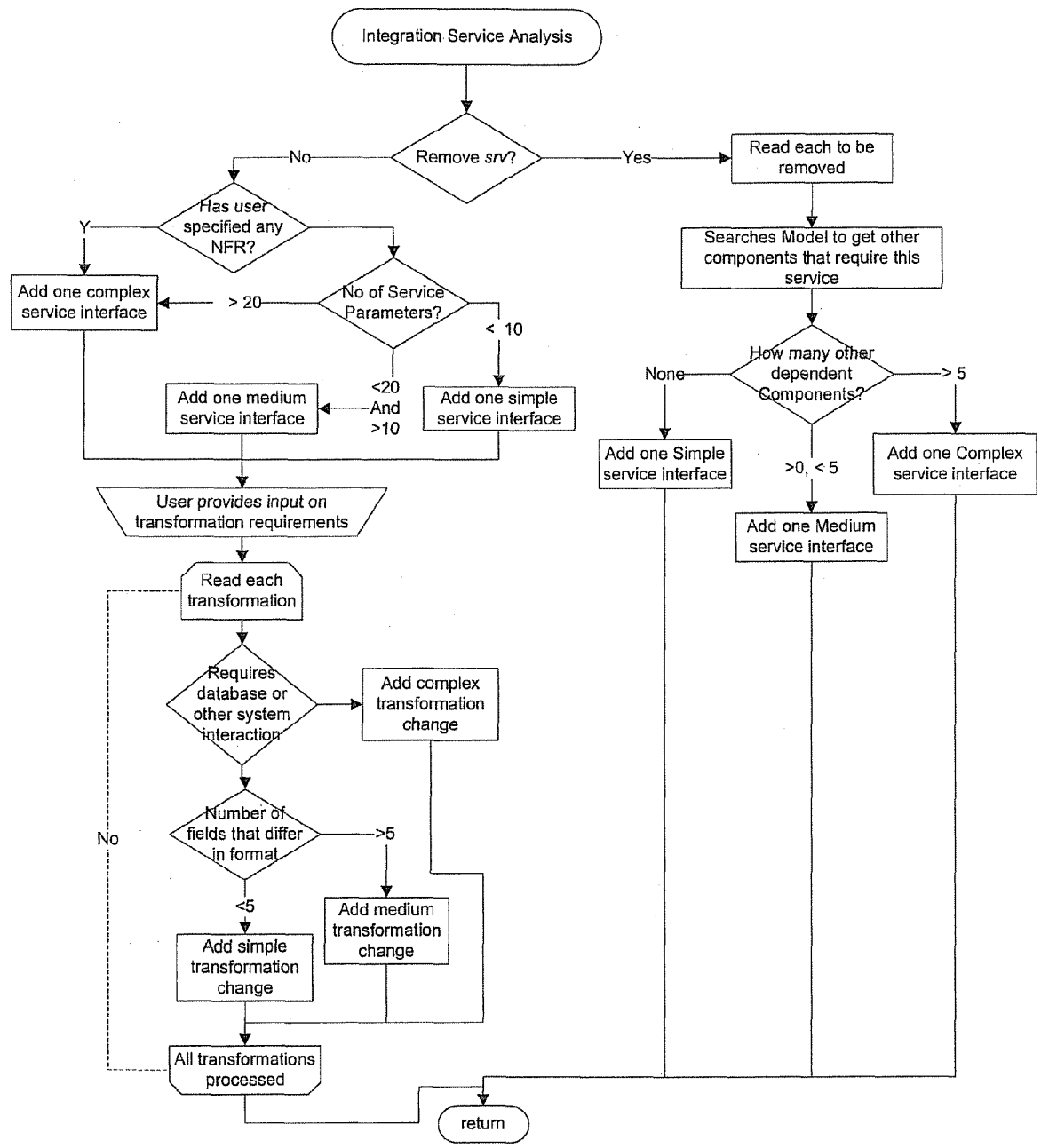
FIG. 10 illustrates a flow diagram of an example operation to create one or more component impacts as part of the integration service analysis operation.

FIG. 10 illustrates a flow diagram of an example operation to create one or more component impacts 124 as part of the integration service analysis operation. For example, the operation may include searching the architecture model 116 for components that depend on the service being analyzed.

Figure 11:
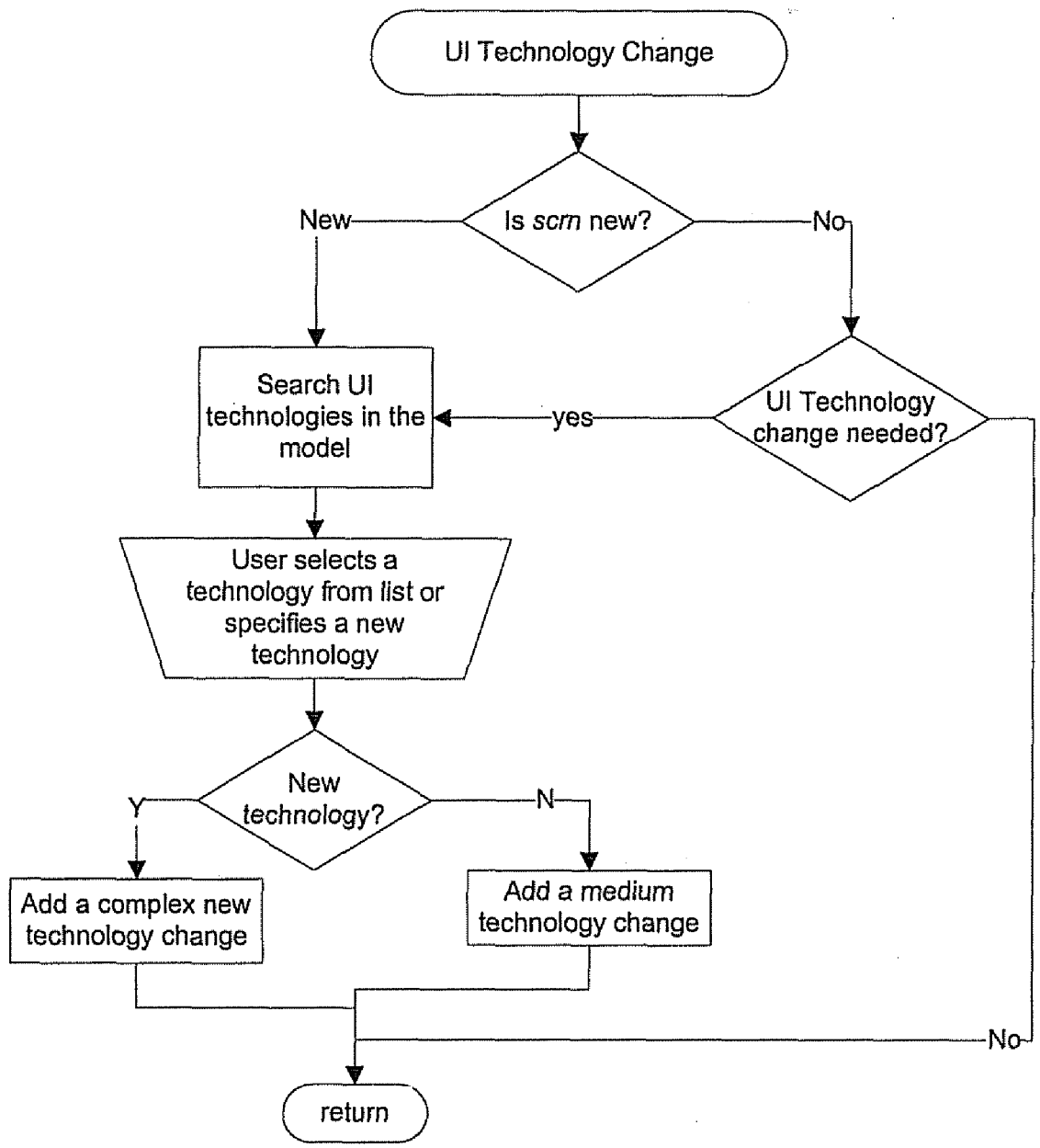
FIG. 11 illustrates a flow diagram of an example operation to create one or more component impacts based on whether the technology associated with the "UI Screen Component" component is new where the change type is a user interface change.

FIG. 11 illustrates a flow diagram of an example operation to create one or more component impacts 124 based on whether the technology associated with the screen component is new. The steps in the operation may be performed as part of step 418 in FIG. 4.

Figure 12:
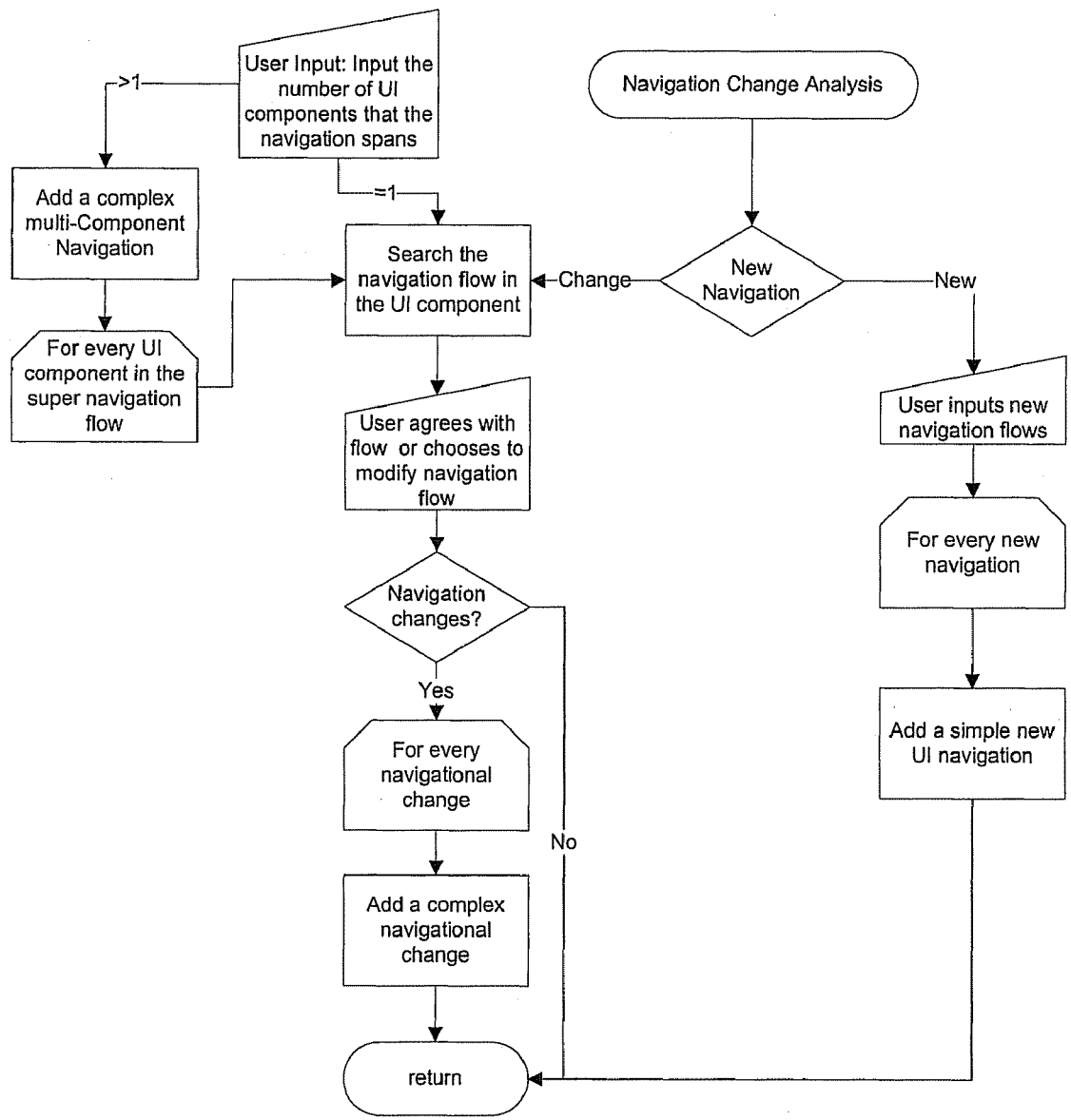
FIG. 12 illustrates a flow diagram of an example operation to create one or more component impacts based on navigational changes in the "UI Screen Component" component where the change type is a user interface change.

FIG. 12 illustrates a flow diagram of an example operation to create one or more component impacts 124 based on navigational changes in the screen component. The steps in the operation may be performed as part of step 416 in FIG. 4.

Figure 13:
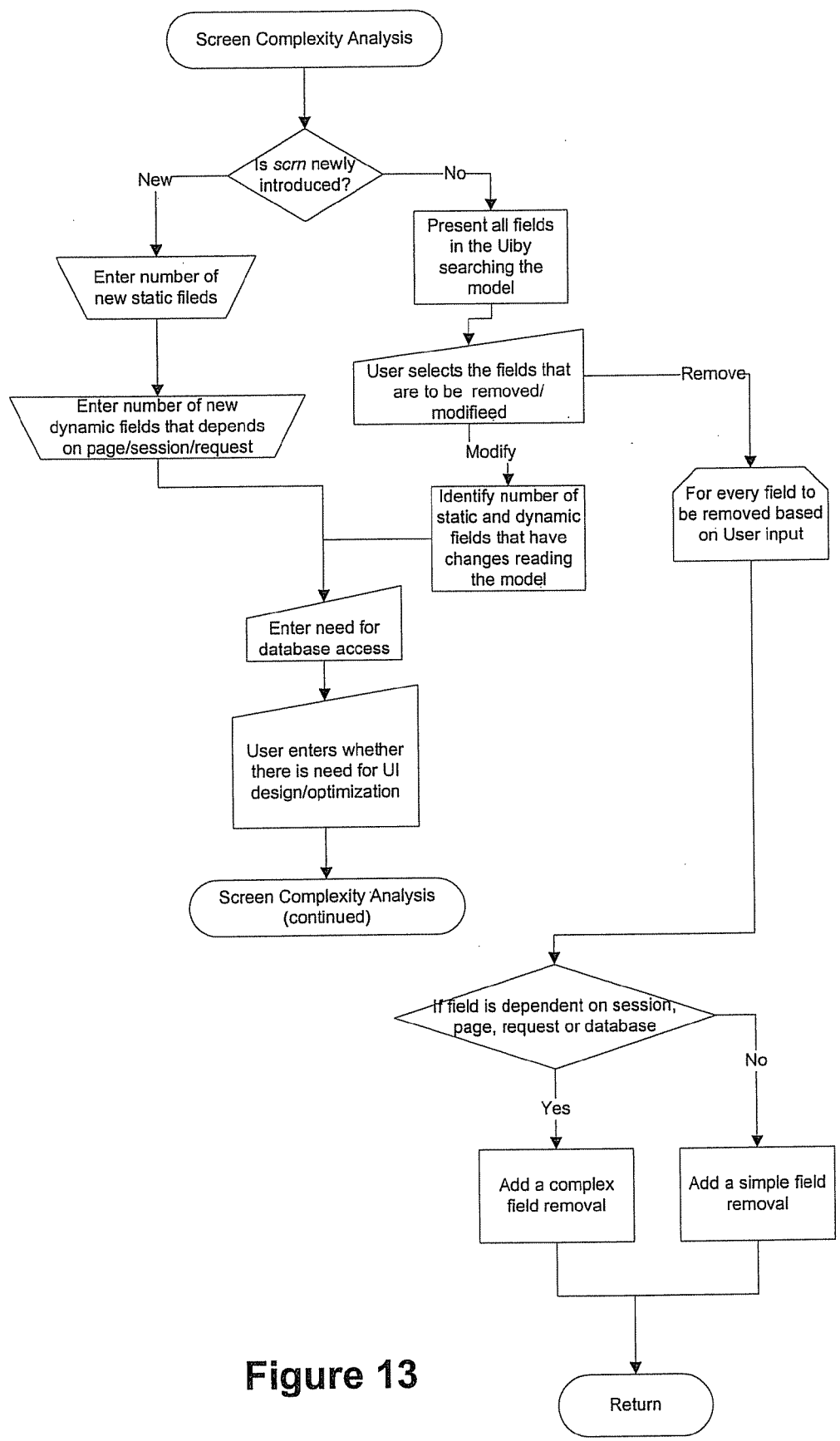
FIG. 13 illustrates a flow diagram of a first portion of an example operation to create one or more component impacts based a complexity analysis of the "UI Screen Component" component where the change type is a user interface change.

FIG. 13 illustrates a flow diagram of a first portion of an example operation to create one or more component impacts 124 based a complexity analysis of the screen component. The steps in the operation may be performed as part of step 416 in FIG. 4.

Figure 14:
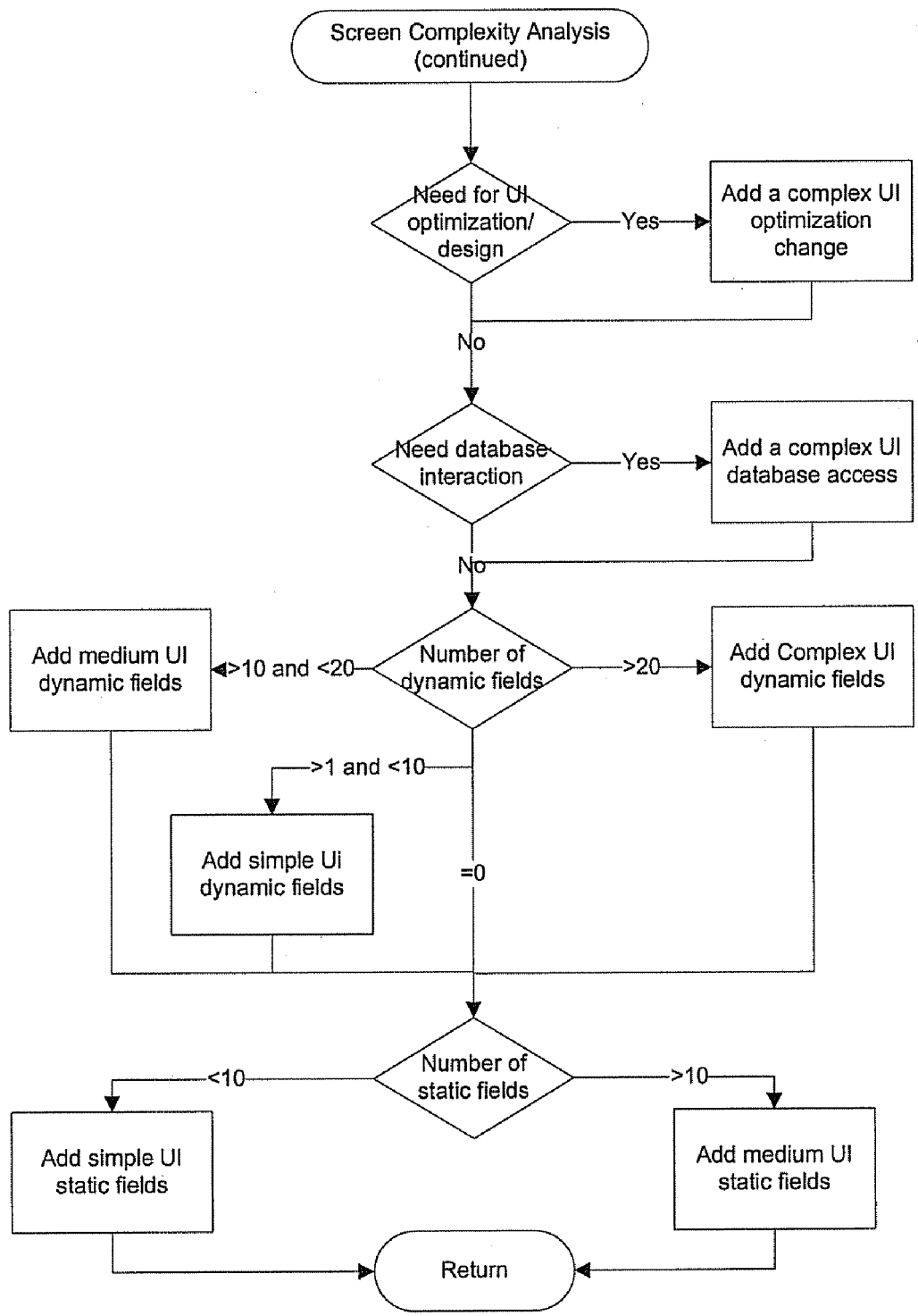
FIG. 14 illustrates a flow diagram of a second portion an example operation to create one or more component impacts based on a complexity analysis of the "UI Screen Component" component where the change type is a user interface change.

FIG. 14 illustrates a flow diagram of a second portion an example operation to create one or more component impacts 124 based on a complexity analysis of the screen component. The steps in the operation may be performed as part of step 416 in FIG. 4.

Figure 15:
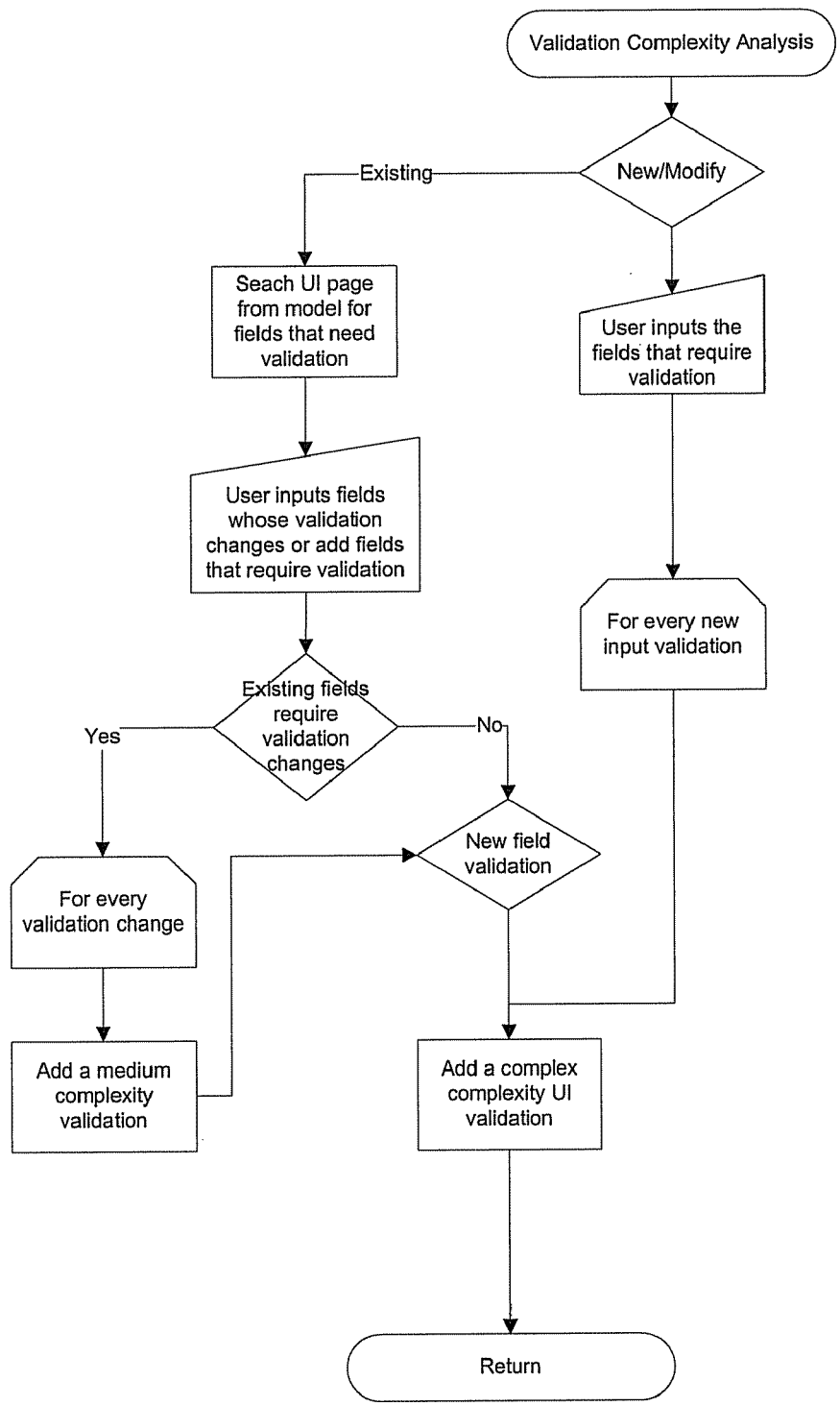
FIG. 15 illustrates a flow diagram of an example operation to create one or more component impacts based on a validation complexity analysis of the "UI Screen Component" component where the change type is a user interface change.

FIG. 15 illustrates a flow diagram of an example operation to create one or more component impacts 124 based on a validation complexity analysis of the screen component. The steps in the operation may be performed as part of step 416 in FIG. 4.

Figure 16:
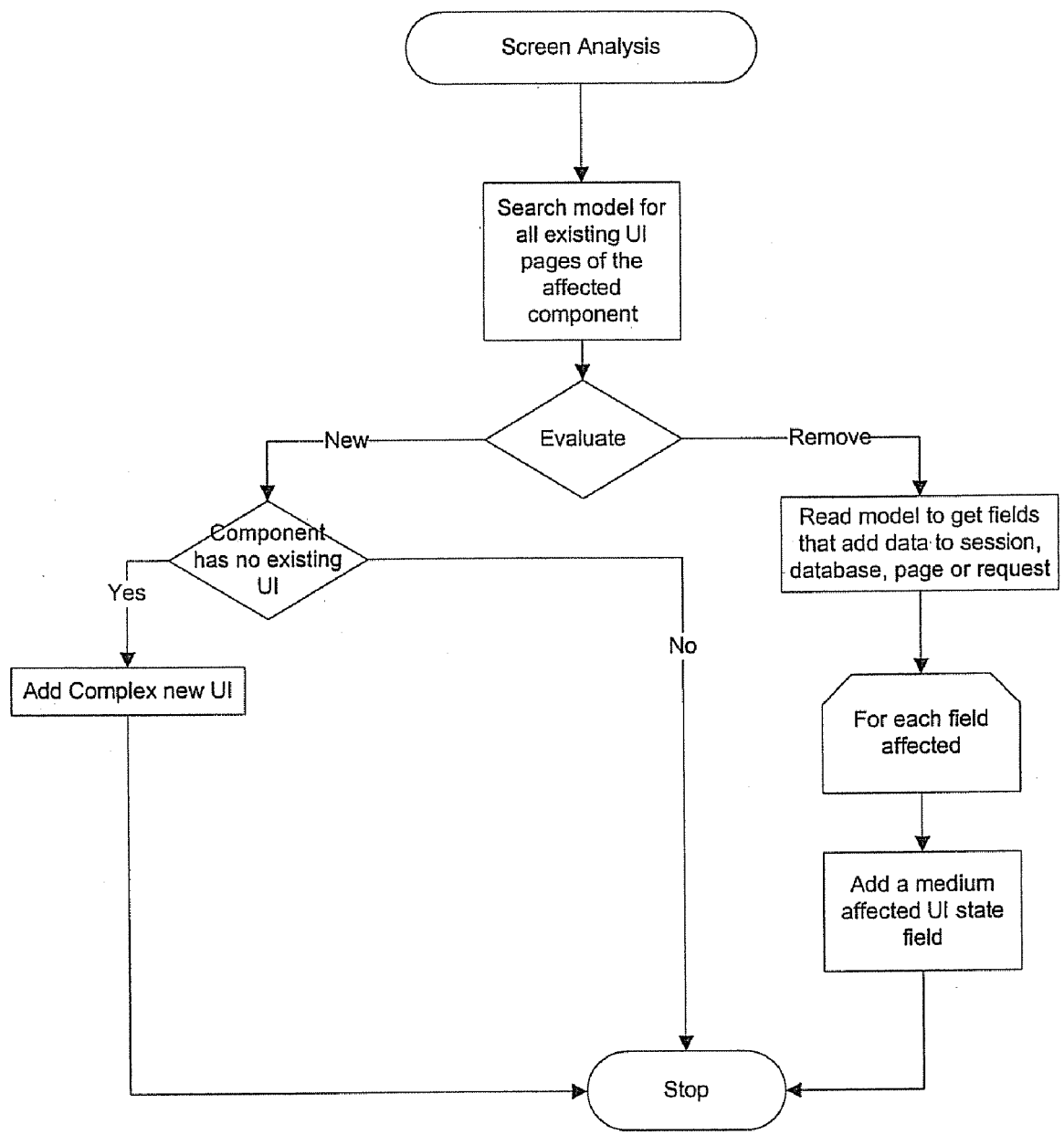
FIG. 16 illustrates a flow diagram of an example operation to create one or more component impacts based on a field analysis of the "UI Screen Component" component where the change type is a user interface change.

FIG. 16 illustrates a flow diagram of an example operation to create one or more component impacts 124 based on a field analysis of the screen component. The steps in the operation may be performed as part of step 416 in FIG. 4

Figure 17:
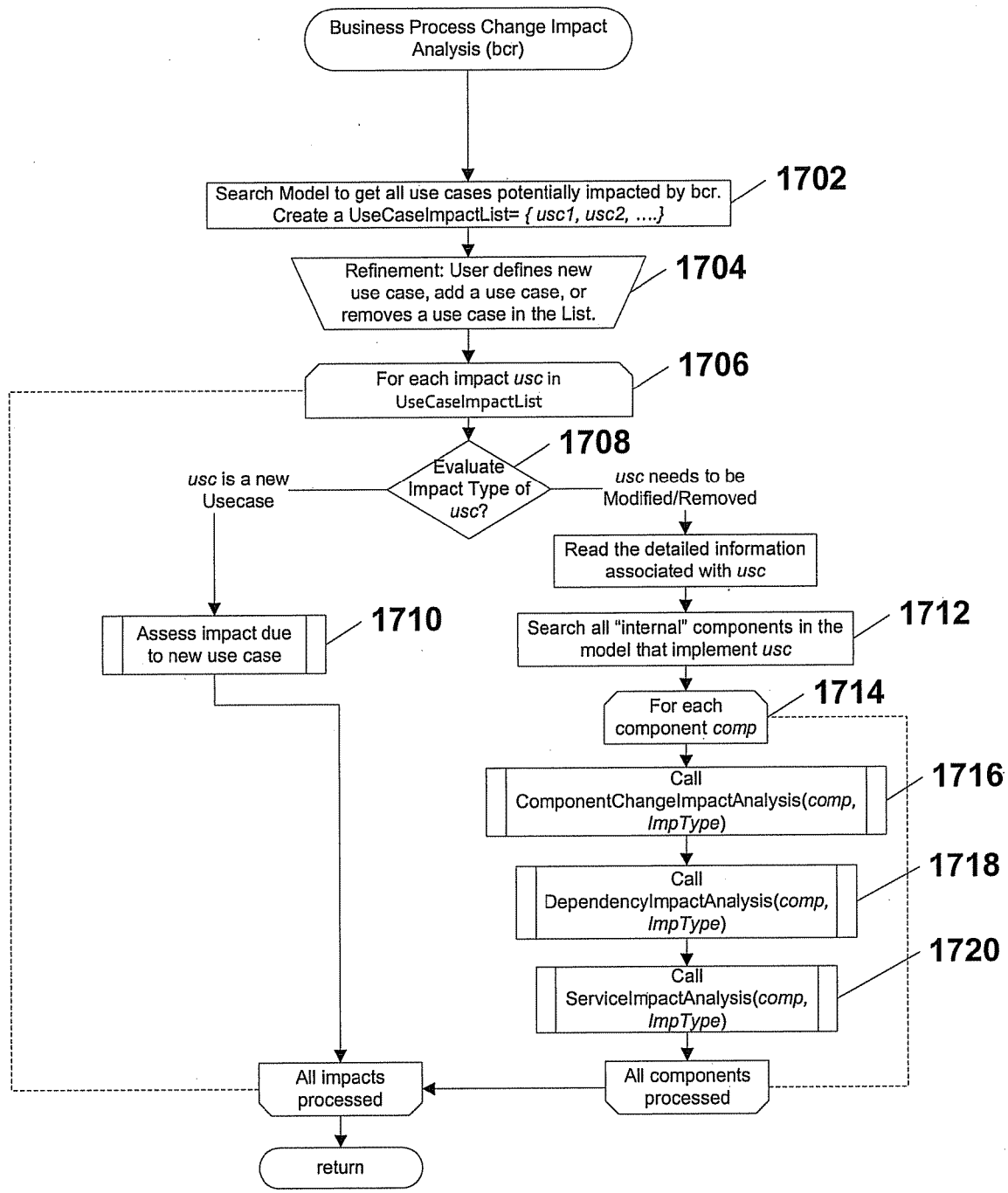
FIG. 17 illustrates a flow diagram of an example operation to create one or more component impacts based on the change type being a business logic/flow change.

FIG. 17 illustrates a flow diagram of an example operation to create one or more component impacts 124 based on the change type 120 being a business logic/flow change. The operation may include more, fewer, or different steps. The steps may be performed in an order different than illustrated in FIG. 17. In one example, the steps in the operation may be performed as part of step 308 in FIG. 3.

The operation may begin at step 1702 by searching the architecture model 116 to identify business scenarios, or use cases, potentially impacted by the business logic/flow change. For example, in step 1702, the impact estimator 102 may search for uses cases associated with the keywords 122 of the identified change 118. In step 1704, the user may modify the identified use cases. For example, the user may create a new use case, add one of the existing use cases that was not identified, and/or remove one of the use cases identified by the impact estimator 102.

Starting in step 1706, the identified use cases may be separately analyzed. For example in step 1708, the operation may include evaluating the type of impact on the use case being analyzed. For example, the use case may be a new use case created by the user in step 1704. In another example, the change request 114 may indicate that the use case is to be removed from the software program. In yet another example, the change request 114 may indicate that the use case is to be modified in some way. In still another example, the user may identify the type of impact on the use case with the user input device 112.

If the use case is a new use case, then in step 1710, the user identify the degree of effort 126 involved in add such a use case. For example, the user may select easy, medium, or hard as the level of difficulty 128 from a list box control displayed on the display 110.

In step 1712, the operation may include searching all of the components in the architecture model 116 that are both associated with the use case and that are internal components. The matching components may be identified as use case components. Internal components are those components that are not external components and that implement the use case. Internal components may be components included in the application under maintenance. External components may be third party components and/or applications with which the application under maintenance integrates. In step 1714, the operation may separately analyze each of the use case components.

For example, in step 1716, the operation may include performing a component change impact analysis operation on the use case currently being analyzed. One such operation is illustrated in FIG. 18.

For example, in step 1718, the operation may include performing a dependency impact analysis operation on the use case currently being analyzed. One such operation is illustrated in FIG. 19.

For example, in step 1720, the operation may include performing a service impact analysis operation on the use case currently being analyzed. One such operation is illustrated in FIG. 20.

Figure 18:
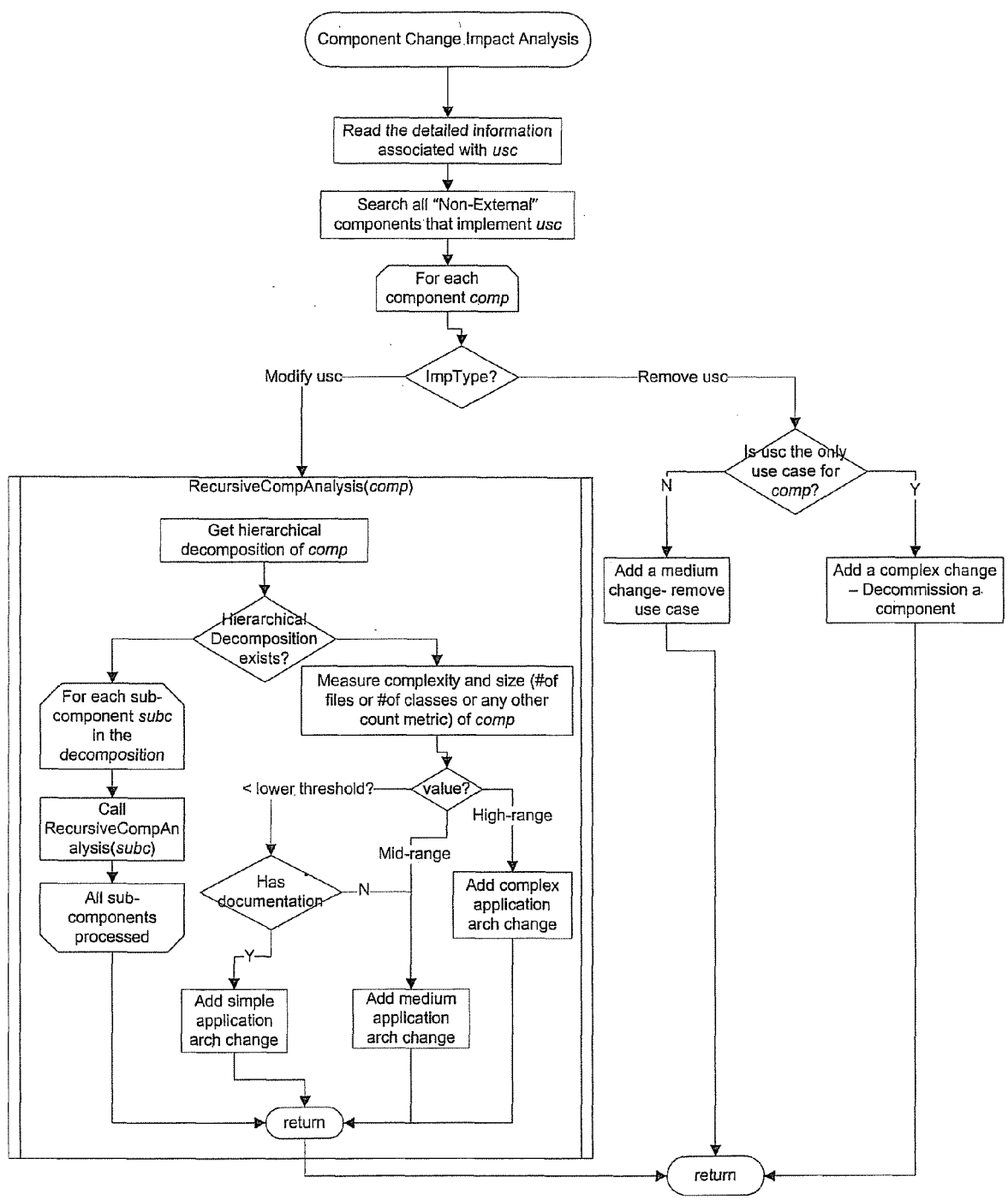
FIG. 18 illustrates a flow diagram of an example operation to create one or more component impacts based on the component change impact analysis on the use case where the change type is a business logic/flow change.

FIG. 18 illustrates a flow diagram of an example operation to create one or more component impacts 124 based on the component change impact analysis on the use case.

Figure 19:
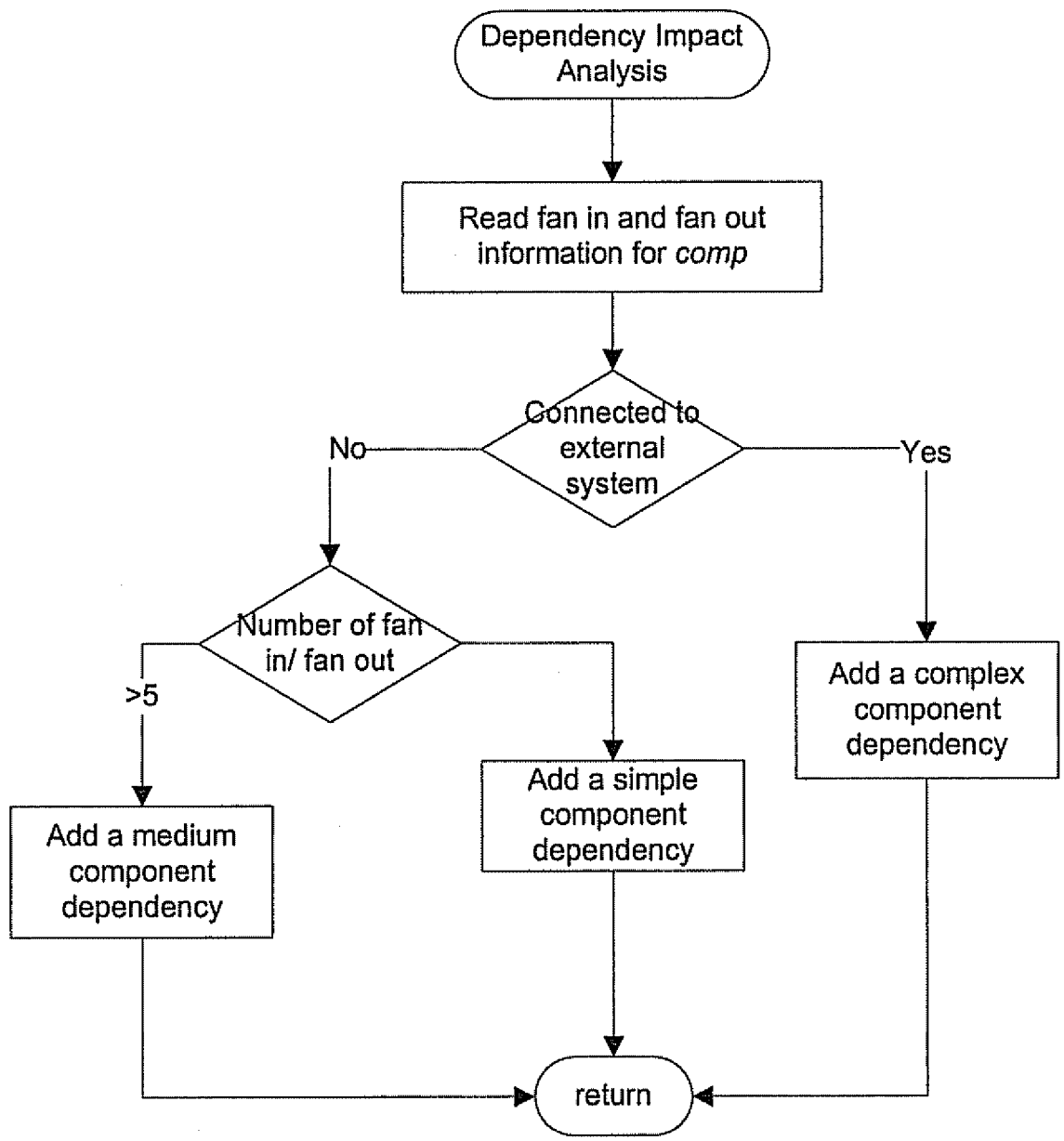
FIG. 19 illustrates a flow diagram of an example operation to create one or more component impacts based on the dependency impact analysis operation on the use case where the change type is a business logic/flow change.

FIG. 19 illustrates a flow diagram of an example operation to create one or more component impacts 124 based on the dependency impact analysis operation on the use case.

Figure 20:
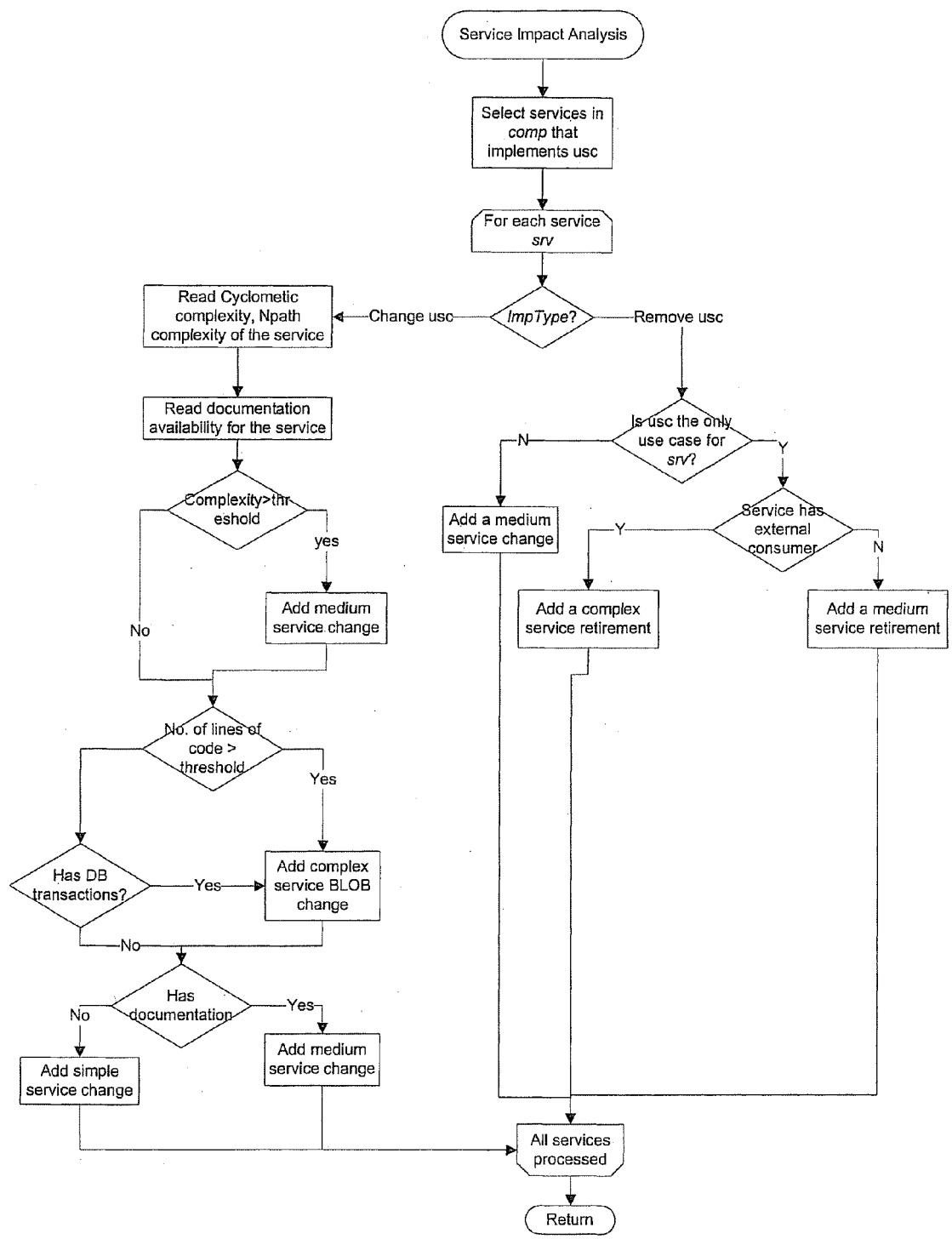
FIG. 20 illustrates a flow diagram of an example operation to create one or more component impacts based on the service impact analysis operation on the use case where the change type is a business logic/flow change.

FIG. 20 illustrates a flow diagram of an example operation to create one or more component impacts 124 based on the service impact analysis operation on the use case.

Figure 21:
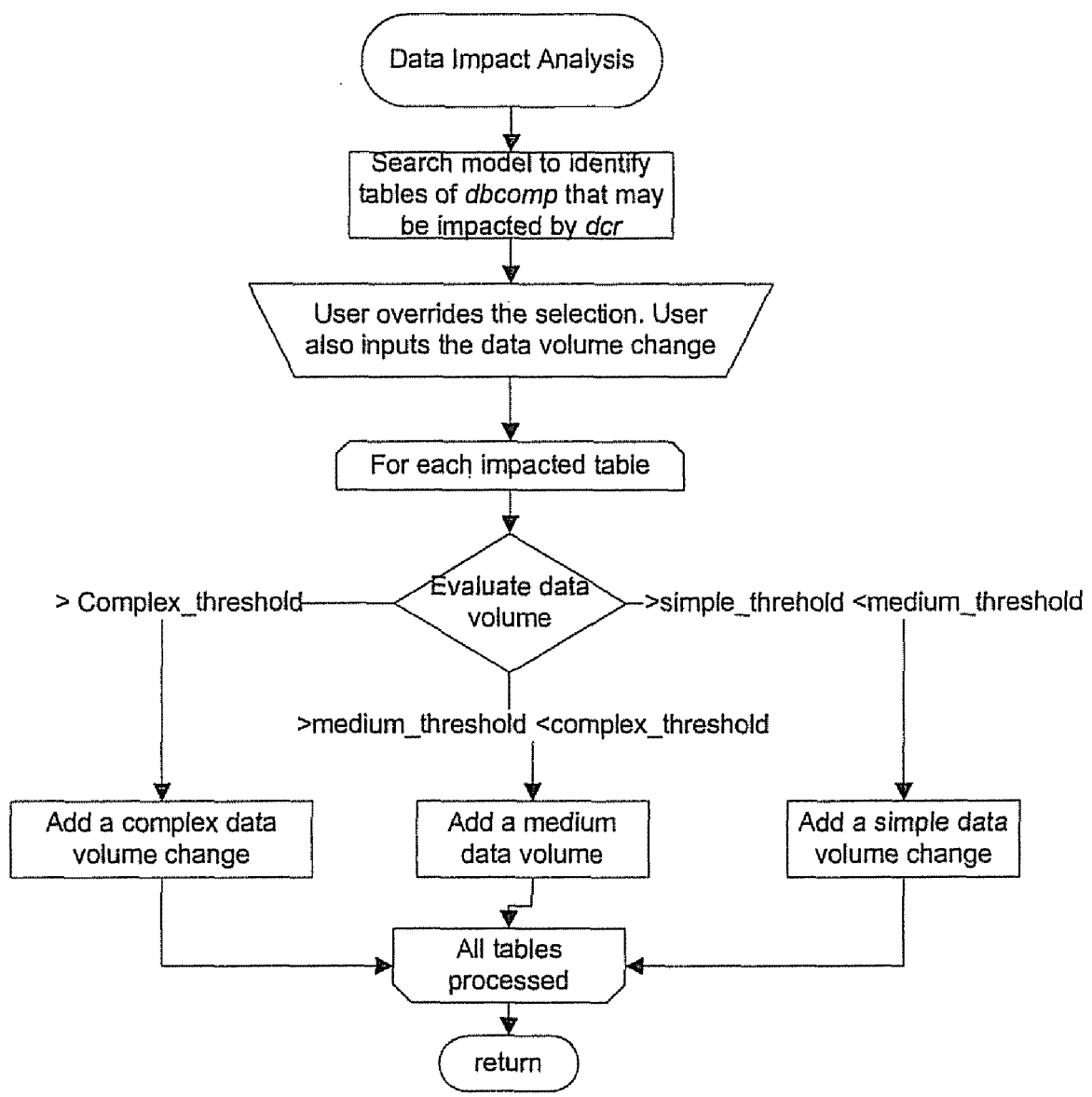
FIG. 21 illustrates a flow diagram of an example operation to create one or more component impacts based on the data impact of a change to a "Database Component" where the change type is a business logic/flow change.

FIG. 21 illustrates a flow diagram of an example operation to create one or more component impacts 124 based on the data impact of a change to a "Database Component". For example, the operation may be performed as part of step 508 in FIG. 5.

Figure 22:
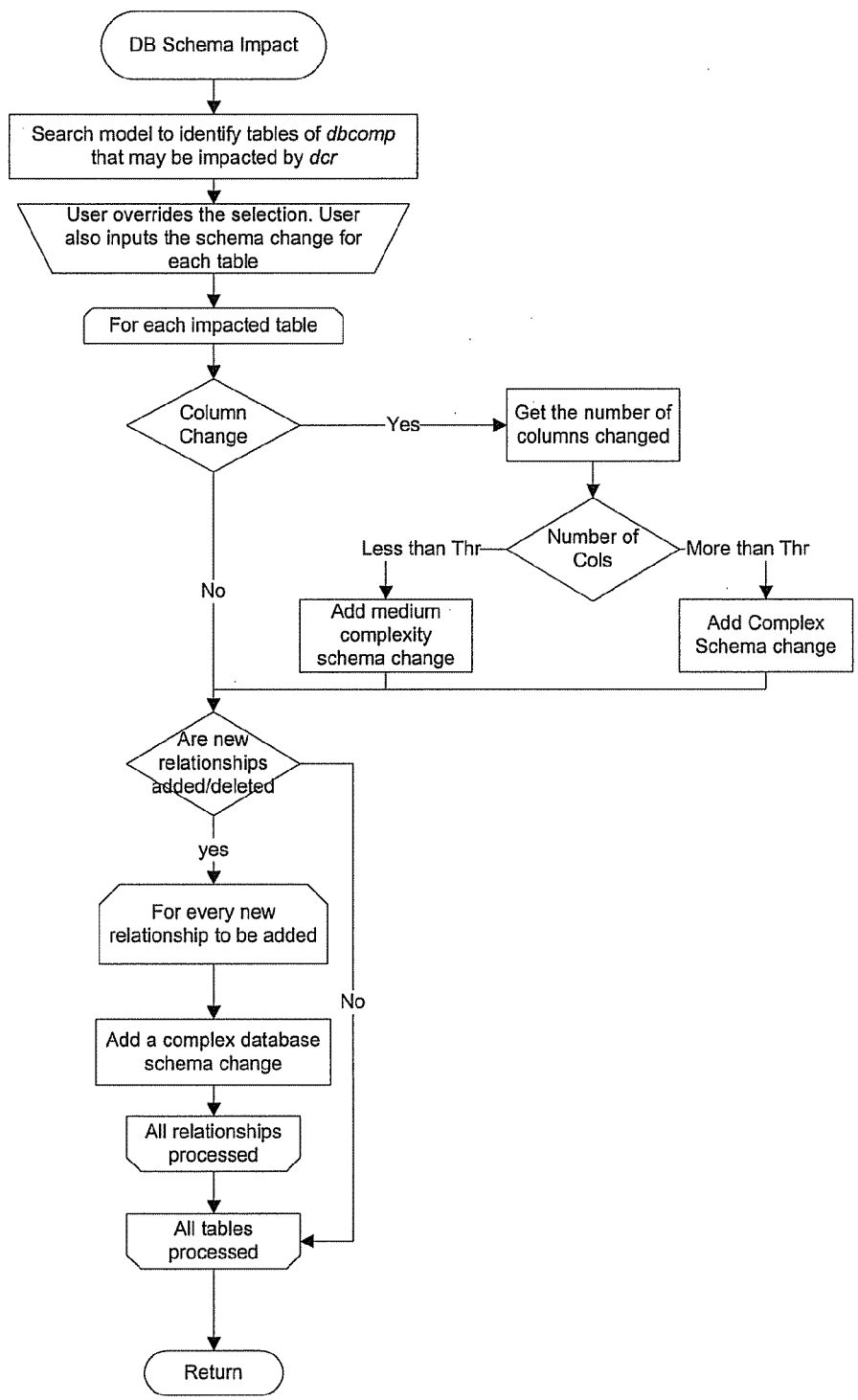
FIG. 22 illustrates a flow diagram of an example operation to create one or more component impacts based on the schema impact of a change to a "Database Component" where the change type is a business logic/flow change.

FIG. 22 illustrates a flow diagram of an example operation to create one or more component impacts 124 based on the schema impact of a change to a "Database Component". For example, the operation may be performed as part of step 510 in. FIG. 5.

Figure 23:
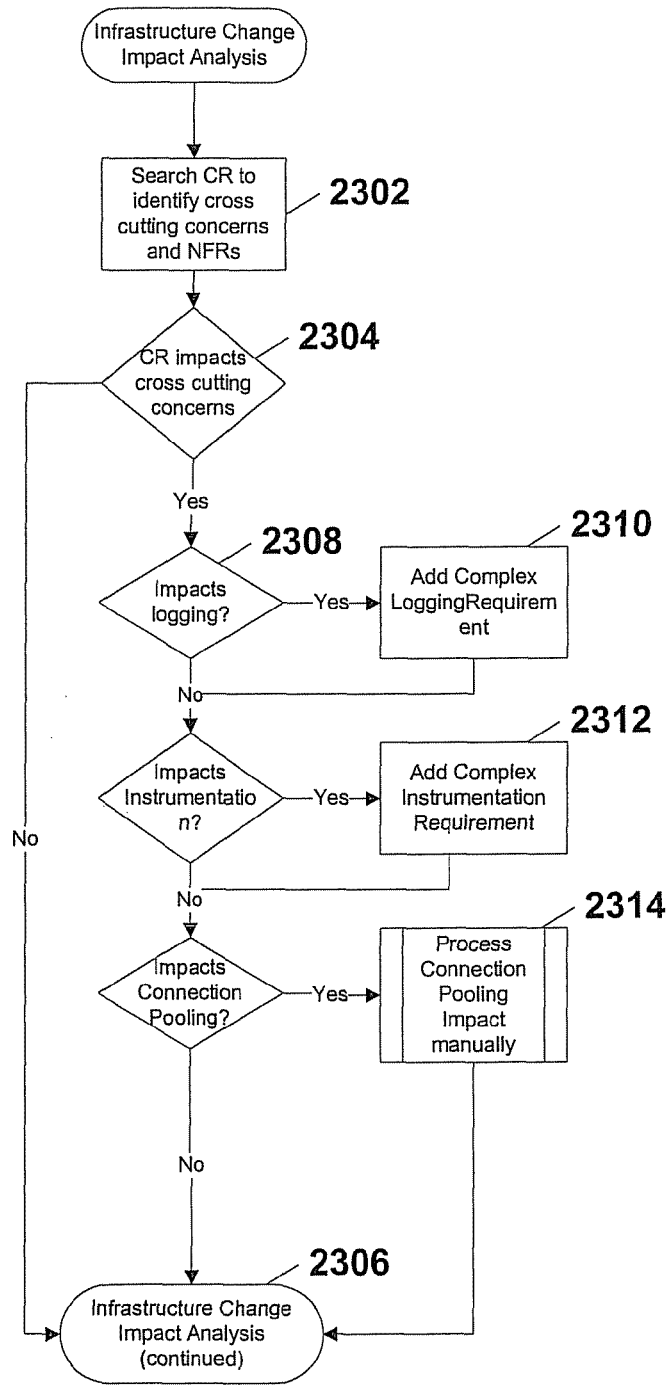
FIG. 23 illustrates a flow diagram of a first portion of an example operation to create one or more component impacts based on the change type being the infrastructure change.
Figure 24:
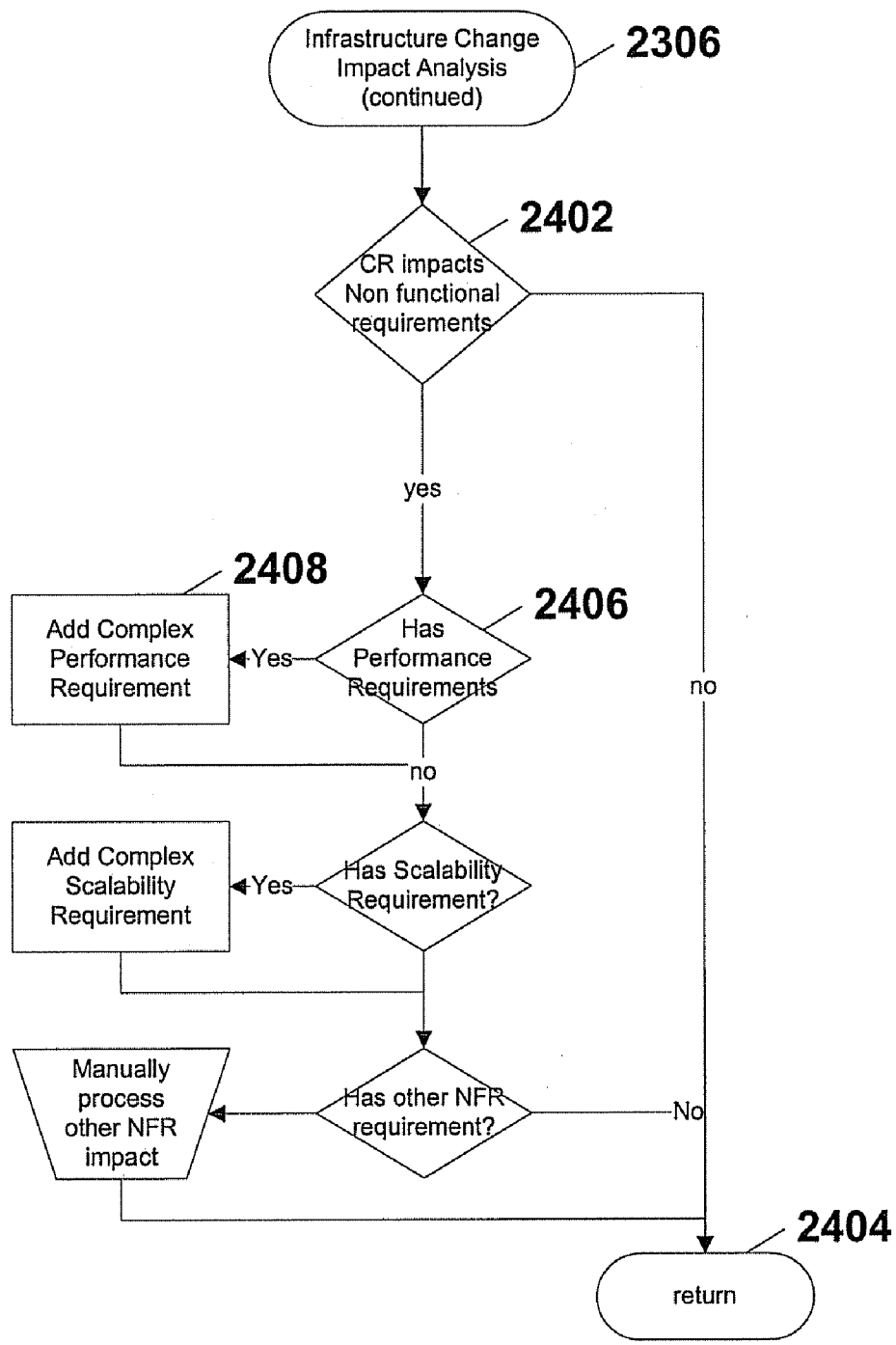
FIG. 24 illustrates a flow diagram of a second portion of the example operation to create one or more component impacts based on the change type being the infrastructure change.

FIG. 23 illustrates a flow diagram of a first portion of an example operation to create one or more component impacts 124 based on the change type 120 being the infrastructure change. FIG. 24 illustrates a flow diagram of a second portion of the example operation to create one or more component impacts 124 based on the change type 120 being the infrastructure change. The operation may include more, fewer, or different steps. The steps may be performed in an order different than illustrated in FIGS. 23 and 24. In one example, the operation may be performed as part of step 316 of FIG. 3.

The operation may begin in step 2302 by searching the change request 114 to identify whether the change request 114 involves any cross cutting concerns and whether the change request 114 involves any non-functional requirements. Cross cutting concerns relate to matters common to two or more components. For example, logging is an example of a cross cutting concern. Non-functional requirements may be desired qualities that include criteria that may be used to judge the operation of the software program, rather than specific behaviors. Non-functional requirements may be contrasted with functional requirements, which specify specific desired behavior or functions. In general, functional requirements describe what the software program is supposed to do, whereas non-functional requirements describe how the software program is supposed to be. Examples of non-functional requirements include desired performance and/or scalability characteristics. In one example, searching for cross cutting concerns and non-functional requirements may include searching for keywords indicative of a cross cutting concern or a non-functional requirement respectively.

At step 2304, the operation may include determining whether the change request 114 involves any cross cutting concerns. If not, the operation may continue to step 2306. Otherwise, the operation may continue by checking for any one of the types of cross cutting concerns.

For example, in step 2308, the operation may include checking whether the change request 114 involves logging. If the change request 114 does involve logging, then the operation may include, at step 2310, adding a new component impact 124 with the component change type 134 being a "complex logging requirement."

In another example, the operation may include checking whether the change request 114 involves an impact to instrumentation and/or to database connection pooling. Accordingly, the operation may includes steps 2312 and 2314 respectively to add new component impacts 124 with a corresponding component change type 134.

At step 2306, the operation may continue to step 2402 as illustrated in FIG. 24. In step 2402, the operation may include determining whether the change request 114 involves any non-functional requirements. If not, the operation may proceed to step 2404, where the operation completes. Otherwise, the operation may continue by checking for any one of the non-functional requirements.

For example, the operation may include, at step 3506, determining whether the change request 114 involves desired performance requirements. If so, then the operation, at step 2408, may add a new component impact 124. The component change type 134 of the new component impact 124 may be "add performance requirement." The level of difficulty 128 may be, for example, "complex" or "difficult."

Different components may provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A system to determine an impact of an implementation of a change request on a software program, the system comprising:
    a processor; and
    a memory in communication with the processor, the memory including computer code and an architecture model of the software program that uses an architecture description language, wherein the architecture model of the software program includes a plurality of components that each model functionality at a level of abstraction and a plurality of connectors that each model communication between two or more of the plurality of components, wherein the computer code is executable to:
        determine a plurality of identified changes from the change request, wherein each of the identified changes identifies a corresponding change in the software program to implement the change request;
        determine a plurality of component impacts based on the identified changes by:
            identifying, based on the plurality of components and the plurality of connectors included in the architecture model of the software program, components included in the architecture model of the software program impacted by the identified changes,
            for each of the identified components, determining a level of difficulty associated with changing the identified component impacted by the identified changes, and
            for each of the identified components, determining a degree of effort needed to implement changes to the identified component impacted by the identified changes based on the determined level of difficulty; and
        determine an overall impact of implementing the change request based on the determined degree of effort of each of the component impacts, wherein the plurality of components included in the architecture model of the software program are associated keywords; and
        wherein identifying, based on the plurality of components and the plurality of connectors included in the architecture model of the software program, components included in the architecture model of the software program impacted by the identified changes comprises:
    parsing, from the change request, a keyword;
    comparing the parsed keyword from the change request to the keywords associated with the plurality of components included in the architecture model of the software program; and
    identifying, based on the comparison, one or more components included in the architecture model of the software program that are associated with a keyword that matches the parsed keyword.

2. The system of claim 1, wherein each of the identified changes identifies a corresponding change type and wherein the change type of each respective one of the identified changes includes one of: a business logic change, a database change, an external system integration change, a user interface change, and an infrastructure change.

3. The system of claim 1, wherein each of the identified changes identifies a corresponding change type and wherein the computer code is further executable to determine each of the component impacts based on the corresponding change type of the corresponding one of the identified changes.

4. The system of claim 1, wherein the computer code is executable to determine the identified changes based on at least one keyword found in the change request.

5. The system of claim 1, wherein the computer code is further executable to determine an identified change from the change request, wherein the identified change includes an identification of a component to be added to the software program in order to complete the implementation of the change request, and the component is absent from the architecture model of the software program.

6. The system of claim 1, wherein determining the degree of effort needed to implement changes to the identified component impacted by the identified changes based on the determined level of difficulty comprises using an estimation model to calculate a number of developer hours that correspond to the determined level of difficulty.

7. The system of claim 1:
    wherein determining the degree of effort needed to implement changes to the identified component impacted by the identified changes based on the determined level of difficulty comprises determining a number of hours a developer would expend to implement the change request with respect to the identified component; and
    wherein the computer code is executable to determine the overall impact of implementing the change request based on the determined degree of effort of each of the component impacts by summing the hours included in the degree of effort for each of the identified components.

8. The system of claim 1:
wherein the computer code is executable to modify the plurality of identified changes based on user input; and
wherein the computer code is executable to determine the plurality of component impacts based on the identified changes by determining the plurality of component impacts based on the modified changes.

9. The system of claim 1, wherein identifying, based on the plurality of components and the plurality of connectors included in the architecture model of the software program, components included in the architecture model of the software program impacted by the identified changes comprises:
determining a change type associated with the change request; and
limiting the identified components included in the architecture model of the software program impacted by the identified changes to those components to which the change type is applicable.

10. A method to determine an impact of an implementation of a change request on a software program, the method comprising:
accessing an architecture model of the software program that uses an architecture description language, the architecture model including a plurality of components that each model functionality at a level of abstraction and a plurality of connectors that each model communication between two or more of the plurality of components;
determining, with a processor, identified changes from the change request, wherein each of the identified changes identifies a corresponding change in the software program to implement the change request;
determining, with a processor, a plurality of component impacts based on the identified changes by:
identifying, based on the plurality of components and the plurality of connectors included in the architecture model of the software program, components included in the architecture model of the software program impacted by the identified changes,
for each of the identified components, determining a level of difficulty associated with changing the identified component impacted by the identified changes, and
for each of the identified components, determining a degree of effort needed to implement changes to the identified component impacted by the identified changes based on the determined level of difficulty;
determining an overall impact of implementing the change request based on the determined degree of effort of each of the component impacts; and
displaying the overall impact of implementing the change request, wherein the plurality of components included in the architecture model of the software program are associated keywords; and wherein identifying, based on the plurality of components and the plurality of connectors included in the architecture model of the software program, components included in the architecture model of the software program impacted by the identified changes comprises:
parsing, from the change request, a keyword;
comparing the parsed keyword from the change request to the keywords associated with the plurality of components included in the architecture model of the software program; and
identifying, based on the comparison, one or more components included in the architecture model of the software program that are associated with a keyword that matches the parsed keyword.

11. The method of claim 10, wherein determining the degree of effort includes comparing a number of page navigations described in an impacted component with a predetermined threshold value.

12. The method of claim 10, further comprising creating a task in a project server corresponding to the overall impact of implementing the change request.

13. The method of claim 10, further comprising:
associating a keyword with an impacted component included in the plurality of components; and
identifying the keyword in the change request.

14. The method of claim 13, wherein associating the keyword with the impacted component includes associating the keyword with a use case and associating the use case with the impacted component.

15. A non-transitory computer-readable medium encoded with computer executable instructions, the computer executable instructions executable with a processor, the computer-readable medium comprising:
instructions executable to retrieve an architecture model of a software program that uses an architecture description language, the architecture model including a plurality of components that each model functionality at a level of abstraction and a plurality of connectors that each model communication between two or more of the plurality of components;
instructions executable to determine a plurality of identified changes from a change request, wherein each of the identified changes identifies a corresponding change in the software program to implement the change request;
instructions executable to determine a plurality of component impacts based on the identified changes by:
identifying, based on the plurality of components and the plurality of connectors included in the architecture model of the software program, components included in the architecture model of the software program impacted by the identified changes,
for each of the identified components, determining a level of difficulty associated with changing the identified component impacted by the identified changes, and
for each of the identified components, determining a degree of effort needed to implement changes to the identified component impacted by the identified changes based on the determined level of difficulty; and
instructions executable to determine an overall impact of implementing the change request based on the determined degree of effort of each of the component impacts, wherein the plurality of components included in the architecture model of the software program are associated keywords; and wherein identifying, based on the plurality of components and the plurality of connectors included in the architecture model of the software program, components included in the architecture model of the software program impacted by the identified changes comprises:
parsing, from the change request, a keyword;
comparing the parsed keyword from the change request to the keywords associated with the plurality of components included in the architecture model of the software program; and
identifying, based on the comparison, one or more components included in the architecture model of the software program that are associated with a keyword that matches the parsed keyword.

16. The computer-readable medium of claim 15, wherein the degree of effort is based on an attribute of at least one component.

17. The computer-readable medium of claim 16, wherein the attribute of the at least one component includes a list of dependencies, the list of dependencies includes a dependency of a first service on a second service, and the first service is provided by the at least one component.

18. The computer-readable medium of claim 16, wherein the degree of the effort is determined based on a comparison of a value of the attribute of the at least one component with a threshold value.

19. The computer-readable medium of claim 16, wherein the attribute includes an identification of page navigations between a plurality of User Interface screen components, the User Interface screen components included in the at least one component.

* * * * *